United States Patent
Luo

(10) Patent No.: US 9,311,724 B2
(45) Date of Patent: Apr. 12, 2016

(54) METHOD FOR USER INPUT FROM ALTERNATIVE TOUCHPADS OF A HANDHELD COMPUTERIZED DEVICE

(71) Applicant: Handscape Inc., Fremont, CA (US)

(72) Inventor: Tong Luo, Fremont, CA (US)

(73) Assignee: Handscape Inc., Fremont, CA (US)

( * ) Notice: Subject to any disclaimer, the term of this patent is extended or adjusted under 35 U.S.C. 154(b) by 320 days.

(21) Appl. No.: 13/770,791

(22) Filed: Feb. 19, 2013

(65) Prior Publication Data

US 2013/0155070 A1 Jun. 20, 2013

Related U.S. Application Data

(63) Continuation-in-part of application No. 12/773,075, filed on May 4, 2010, now Pat. No. 8,384,683, which is a continuation-in-part of application No. 13/223,836, filed on Sep. 1, 2011.

(60) Provisional application No. 61/327,102, filed on Apr. 23, 2010.

(51) Int. Cl.
| | |
|---|---|
| *G06F 3/041* | (2006.01) |
| *G06T 11/20* | (2006.01) |
| *G06F 1/16* | (2006.01) |
| *G06F 3/0488* | (2013.01) |
| *G06T 19/00* | (2011.01) |

(52) U.S. Cl.
CPC .............. *G06T 11/20* (2013.01); *G06F 1/169* (2013.01); *G06F 1/1626* (2013.01); *G06F 1/1643* (2013.01); *G06F 3/04886* (2013.01); *G06T 19/00* (2013.01)

(58) Field of Classification Search
CPC .............................. G06F 3/017; G06F 3/0304
USPC ........................... 345/158, 173; 715/701, 702
See application file for complete search history.

(56) References Cited

U.S. PATENT DOCUMENTS

| | | |
|---|---|---|
| 5,530,234 A | 6/1996 | Loh et al. |
| 6,239,790 B1 | 5/2001 | Martinelli et al. |
| 6,297,752 B1 | 10/2001 | Ni |
| 6,512,511 B2 | 1/2003 | Willner et al. |
| 6,628,511 B2 | 9/2003 | Engstrom |

(Continued)

OTHER PUBLICATIONS

China Intellectual Property Office office action for application CN201110113001 dated Sep. 5, 2014.

(Continued)

*Primary Examiner* — Calvin C Ma
(74) *Attorney, Agent, or Firm* — Stephen E. Zweig

(57) ABSTRACT

The present invention relates to a handheld computerized device with a bit mapped display screen on the front panel, and a touchpad installed in an alternative location. More particularly, the invention relates to a method and graphical user interface that can, for example, enable the user to see the user's finger position and motion from behind the device superimposed upon a virtual keyboard layout on the front panel. This can allow the user to use a touchpad keypad on the back of the device to input keystrokes and mouse actions, and these will be reflected on the display screen on the front of the handheld computerized device as "virtual fingers" or equivalent. The system operates by inputting touchpad data into a software biomechanical and anatomical model of the human hand, optionally supplemented by video or image information to refine this model.

20 Claims, 15 Drawing Sheets

(56) References Cited

U.S. PATENT DOCUMENTS

| | | | |
|---|---|---|---|
| 6,909,424 | B2 | 6/2005 | Liebenow et al. |
| 7,142,195 | B2 | 11/2006 | Northway et al. |
| 7,667,692 | B2 | 2/2010 | Marcus et al. |
| 7,705,799 | B2 | 4/2010 | Niwa |
| 7,724,157 | B1 | 5/2010 | Gray |
| 7,864,164 | B2 | 1/2011 | Cunningham et al. |
| 7,881,055 | B2 | 2/2011 | Brandenberg et al. |
| 8,046,039 | B2 | 10/2011 | Lee et al. |
| 8,279,589 | B2 | 10/2012 | Kim |
| 8,289,702 | B2 | 10/2012 | Karwan |
| 8,384,683 | B2 | 2/2013 | Luo |
| 8,390,573 | B2 | 3/2013 | Trout |
| 8,565,829 | B2 | 10/2013 | Kim et al. |
| 2002/0118175 | A1* | 8/2002 | Liebenow et al. ............ 345/168 |
| 2003/0048205 | A1 | 3/2003 | He |
| 2004/0032398 | A1 | 2/2004 | Ariel et al. |
| 2004/0046744 | A1 | 3/2004 | Rafii et al. |
| 2004/0097256 | A1 | 5/2004 | Kujawski |
| 2006/0007178 | A1 | 1/2006 | Davis |
| 2006/0114233 | A1 | 6/2006 | Radivojevic et al. |
| 2007/0247800 | A1 | 10/2007 | Smith et al. |
| 2007/0262965 | A1* | 11/2007 | Hirai ................. B60R 11/0235 345/173 |
| 2007/0268261 | A1 | 11/2007 | Lipson |
| 2008/0084397 | A1 | 4/2008 | On et al. |
| 2008/0211766 | A1* | 9/2008 | Westerman et al. .......... 345/156 |
| 2008/0285857 | A1 | 11/2008 | Sharan et al. |
| 2009/0009951 | A1 | 1/2009 | Sbaita |
| 2009/0135142 | A1 | 5/2009 | Fu et al. |
| 2009/0167682 | A1* | 7/2009 | Yamashita et al. ............ 345/158 |
| 2009/0195372 | A1* | 8/2009 | Aichi et al. ................... 340/438 |
| 2009/0322499 | A1 | 12/2009 | Pryor |
| 2010/0177035 | A1 | 7/2010 | Schowengerdt et al. |
| 2010/0182399 | A1 | 7/2010 | Choi et al. |
| 2010/0214267 | A1 | 8/2010 | Radivojevic et al. |
| 2010/0315266 | A1* | 12/2010 | Gunawardana et al. ........ 341/22 |
| 2011/0018695 | A1 | 1/2011 | Bells et al. |
| 2011/0029185 | A1* | 2/2011 | Aoki et al. ..................... 701/29 |
| 2011/0306387 | A1 | 12/2011 | Moon |
| 2012/0007822 | A1 | 1/2012 | Luo |
| 2013/0007653 | A1 | 1/2013 | Stolyarov et al. |
| 2013/0149964 | A1 | 6/2013 | Kreiner et al. |
| 2013/0201155 | A1 | 8/2013 | Wu et al. |
| 2013/0278552 | A1 | 10/2013 | Kamin-Lyndgaard |
| 2014/0240267 | A1 | 8/2014 | Luo |

OTHER PUBLICATIONS

International Application No. PCT/US2011/036654, International Search Report and Written Opinion Sep. 1, 2011, 9 pages.
European PatentApplication No. EP14155627.4,Extended Search Report Aug. 21, 2014, 7 pages.
International Application No. PCT/US2014/036679, International Search Report Sep. 25, 2014, 19 pages.
International Application No. PCT/US2014/038779, International Search Report Oct. 7, 2014, 14 pages.
Final Office Action for U.S. Appl. No. 13/223,836 mailed Nov. 26, 2014.
International Application No. PCT/US2014/48273, International Search Report Nov. 25, 2014, 13 pages.
European PatentApplication No. EP11772858.4, Extended Search Report Nov. 12, 2014, 7 pages.
Jania, "Cypress CapSense Successive Approximation Algorithm," Cypress White Paper CSA RJO, pp. 1-6 (2007).
Non-Final Office Action for U.S. Appl. No. 12/773,075 mailed Mar. 2, 2012.
Final Office Action for U.S. Appl. No. 12/773,075 mailed Jul. 19, 2012.
Interview Summary for U.S. Appl. No. 12/773,075 mailed Aug. 29, 2012.
Non-Final Office Action for U.S. Appl. No. 12/773,075 mailed Sep. 24, 2012.
Interview Summary for U.S. Appl. No. 12/773,075 mailed Oct. 19, 2012.
Non-Final Office Action for U.S. Appl. No. 13/223,836 mailed Jan. 10, 2013.
Notice of Allowance for U.S. Appl. No. 12/773,075 mailed Jan. 18, 2013.
Final Office Action for U.S. Appl. No. 13/223,836 mailed Jun. 6, 2013.
Interview Summary for U.S. Appl. No. 13/223,836 mailed Jun. 27, 2013.
Advisory Action for U.S. Appl. No. 13/223,836 mailed Jul. 29, 2013.
Non-Final Office Action for U.S. Appl. No. 13/223,836 mailed Aug. 9, 2013.
Final Office Action for U.S. Appl. No. 13/223,836 mailed Dec. 19, 2013.
Office Action for CN Application No. 201110113001.3 mailed Jan. 6, 2014.
Interview Summary for U.S. Appl. No. 13/223,836 mailed Mar. 20, 2014.
Advisory Action for U.S. Appl. No. 13/223,836 mailed Mar. 28, 2014.
Office Action for Chinese Patent Application No. 201110113001.3 mailed Jan. 6, 2014 (English translation).
Final Office Action for U.S. Appl. No. 13/223,836 mailed May 20, 2014.
Onno A. van Nierop et. al. "A natural human hand model", Visual Comput (2008) 24: 31-44.
Westerman, "Hand Tracking, Finger Identification, and Chordic Manipulation on a Multi-Touch Surface", Electrical Engineering Ph.D. thesis, University of Delaware, Spring 1999.
International Search Report for patent application No. PCT/US2014/056625 (Dec. 30, 2014) 14 pages.
Non-Final Office Action for U.S. Appl. No. 13/223,836 mailed Mar. 5, 2015, 13 pages.

* cited by examiner

METHOD FOR USER INPUT FROM ALTERNATIVE TOUCHPADS OF A HANDHELD COMPUTERIZED DEVICE

CROSS REFERENCE TO RELATED APPLICATIONS

This application is a continuation in part of U.S. patent application Ser. No. 12/773,075 filed on May 4, 2010, entitled "METHOD FOR USER INPUT FROM THE BACK PANEL OF A HANDHELD COMPUTERIZED DEVICE", Tong Luo inventor; This application is also a continuation in part of U.S. patent application Ser. No. 13/223,836 entitled "DETACHABLE BACK MOUNTED TOUCHPAD FOR A HANDHELD COMPUTERIZED DEVICE", filed on Sep. 1, 2011, Tong Luo inventor; application Ser. No. 12/773,075 in turn claimed the priority benefit of U.S. Provisional Application No. 61/327,102 filed on Apr. 23, 2010, entitled "METHOD, GRAPHICAL USER INTERFACE, AND APPARATUS FOR USER INPUT FROM THE BACK PANEL OF A HANDHELD ELECTRONIC DEVICE", Tong Luo inventor; the contents of both applications are incorporated herein by reference.

BACKGROUND OF THE INVENTION

1. Field of the Invention

The present invention relates to a handheld computerized device with a touchpad installed on the back panel or other portion of the body other than the display screen. More particularly, the invention relates to a method and graphical user interface that enables the user to see the user's finger position and motion from the back of the device, superimposed on a keyboard layout on the display screen. This makes it easier for a user to input keystrokes and mouse actions from a touchpad that is installed on the back panel or other portion of the handhold device.

2. Description of the Related Art

Handheld computerized devices (i.e. devices equipped with microprocessors and sophisticated displays) such as cell phones, personal digital assistants (PDA), game devices, tabletPCs (such as iPad), etc., are playing a more and more important role in everyday life, and are becoming more and more indispensible. With the advance of technology, and improvements in the handheld computerized devices' processing power, both function, and memory space is increasing at an amazing pace. Meanwhile the size of the handheld computerized devices continues to get smaller and smaller.

To meet this challenge, the designers of handheld computerized devices typically use two approaches. One approach is to make the keyboard keys smaller and smaller, minaturizing the keys. Additionally the keyboard keys may be given multiple functions—i.e. overloaded, and more complex function keyboard keys may be introduced as well.

The other approach is to use touch screen keyboards, or so called "soft keys", on the front panel. Here a user may use a stylus pen or finger to select the soft keys through a graphical user interface. However due to the optical illusions introduced by the display screen, and the fact that the user's fingers often are on top of the various display screen soft keys (hence blocking them from direct viewing), the soft keys cannot be too small. Another problem is that when the soft keys are too small, often a single finger press will activate multiple keys. As a result, the designer may have to divide the keys into different groups and hierarchies, and only display a small number of keys on the screen.

Both current approaches have some severe drawbacks: the user input area occupies a significant portion of the front panel, and the user input process, although requiring a large amount of user attention to operate, still is very error prone.

Often a user has to use one hand to hold the handheld computerized device, and use the other hand to input data, thus occupying both hands. A user will often have to go through a long sequence of key strokes, and switch back and forth among different user interface screens, in order to complete a fairly simple input. As a result, there is a significant learning curve for a user to learn the overloaded keys, function keys, key grouping, and key hierarchies in order to operate the handheld computerized devices efficiently.

Although previous workers, such as Libenow et. al., U.S. Pat. No. 6,909,424 proposed designs with sensors on the back of the device and representations of the user's fingers on the front of the device, this prior art work failed to adequately describe a procedure by which the indicia of the user's fingers or hands are displayed on the display panel.

Other previous workers, such as Westerman et. al., in US patent application 2008/0211766 described systems in which image sensors would obtain an image of the user's fingers while operating the device, and use this image data to better determine which real or virtual keys the user's fingers were striking Such methods rely, however, on image sensors that are positioned in such a way as to be capable of viewing the tips of the user's fingers. This type of image sensor placement is often difficult to implement on many types of handheld user computerized devices. Another drawback of the Westerman approach is that it is difficult to implement in low light situations. This approach may also be difficult to implement in situations where there is limited smooth and flat desk or table space.

SUMMARY OF THE INTENTION

It is therefore desirable to have a more efficient and user-friendly way to do user input for handheld computerized devices. The present invention presents an effective solution for these above problems. The present invention frees the original keyboard space on the front panel for applications by utilizing the previously mostly unused back panel space for user input. The present invention is able handle both keyboard input and mouse input. The present invention presents a stunning graphic user interface on the front panel screen where a user can see the real-time position and motion of his/her fingers holding the back panel, on top of the display of keyboard layout (virtual keyboard). The invention's approach is more precise than current touch screen keyboard because it removes the display layer that presently exists between the fingers and touch pad. It also moves the user's fingers away from the front panel, so that the user's fingers will not block the view of the soft key or area that the finger is presently operating on. For smaller handheld devices, such as cell phone, iPhone™ or iPad™, the hand that holds the device can now also do input, hence freeing the other hand for other activities.

Thus an object of the invention is to provide a method to provide a more efficient and user-friendly user input for a handheld computerized device.

Another object of the invention is to free up the space currently occupied by the keyboard on the front panel of small electronic devices, and utilize the mostly unused space on the back panel of the handheld devices for user input purposes.

Another object of the invention is to present a visually compelling user-interface design that enables the real time position and motion of the fingers that hold the device, which normally would be hidden from view by the device itself, to be displayed on the front panel as "virtual fingers" together with a display of a keyboard layout (virtual keyboard). The user's finger positions and keyboard layout can be displayed either as background image, or as a transparent layer on top of some of all of the applications currently running on the handheld device. These semi-transparent representations of the user's finger positions and virtual keyboard allow the user to easily enter data while, at the same time, continuing to allow the user unimpeded access to the various applications running on the handheld device. Thus, for example, applications originally written for a computer device that had a physical keyboard may be easily run, without code modification, on a tablet computer device that lacks a physical keyboard. Thus these virtual semi-transparent keyboards and methods that also give information of finger motion of the user can be highly useful.

Another object of the invention is to enable the hand that is holding the device to also do user input operations, hence freeing the other hand for other inputs or other purposes.

In one embodiment, the present invention comprises a device and method with a display screen on the front panel (which may be a bit-mapped display screen); a touchpad embedded on the back panel capable of sensing the user's finger positions and motion, and a graphical user interface. This graphical user interface will normally comprise both software and optional graphics acceleration hardware to enable complex graphics to be rapidly displayed on the display screen. The device also has an optional virtual keyboard processor that displays the keyboard layout, as well as computes and displays the user's finger positions on a real-time basis. The user's finger position and motion on the touchpad of the back panel can thus be computed and displayed on the front display screen as a layer, which may be a semi-transparent layer, on top of all of the other applications. The virtual keyboard processor may also interpret the finger motions (strokes), and invoke corresponding operations based on the known location of the finger position on the keyboard.

Unlike prior art such as Liebenow, however, the user's fingers do not need to be constrained to fit onto particular regions of the touchpad, but rather can be disposed in any arbitrary location. Unlike other prior art such as Westerman, although the invention can be aided to some extent by real-time video that may provide video information pertaining to at least some portion of the user's hand, visualization of the user's fingers, in particular the tips of the user's fingers is not necessary. This makes it feasible to use handheld device video cameras designed for general photographic purposes to be used to help in visualizing the user's hand, without requiring that much of the user's hand in fact be photographed. There is no requirement at all that the user's fingertips be photographed while operating the device.

DETAILED DESCRIPTION OF THE INVENTION

The present invention relates to a handheld computerized device with a bit mapped display screen on the front panel, and a touchpad installed on the back panel, side panel, or other area other than that of the display screen. More particularly, the invention relates to a method and graphical user interface that enable the user to see the user's finger position and motion from behind the device superimposed upon a virtual keyboard layout on the front panel.

Figure 1:
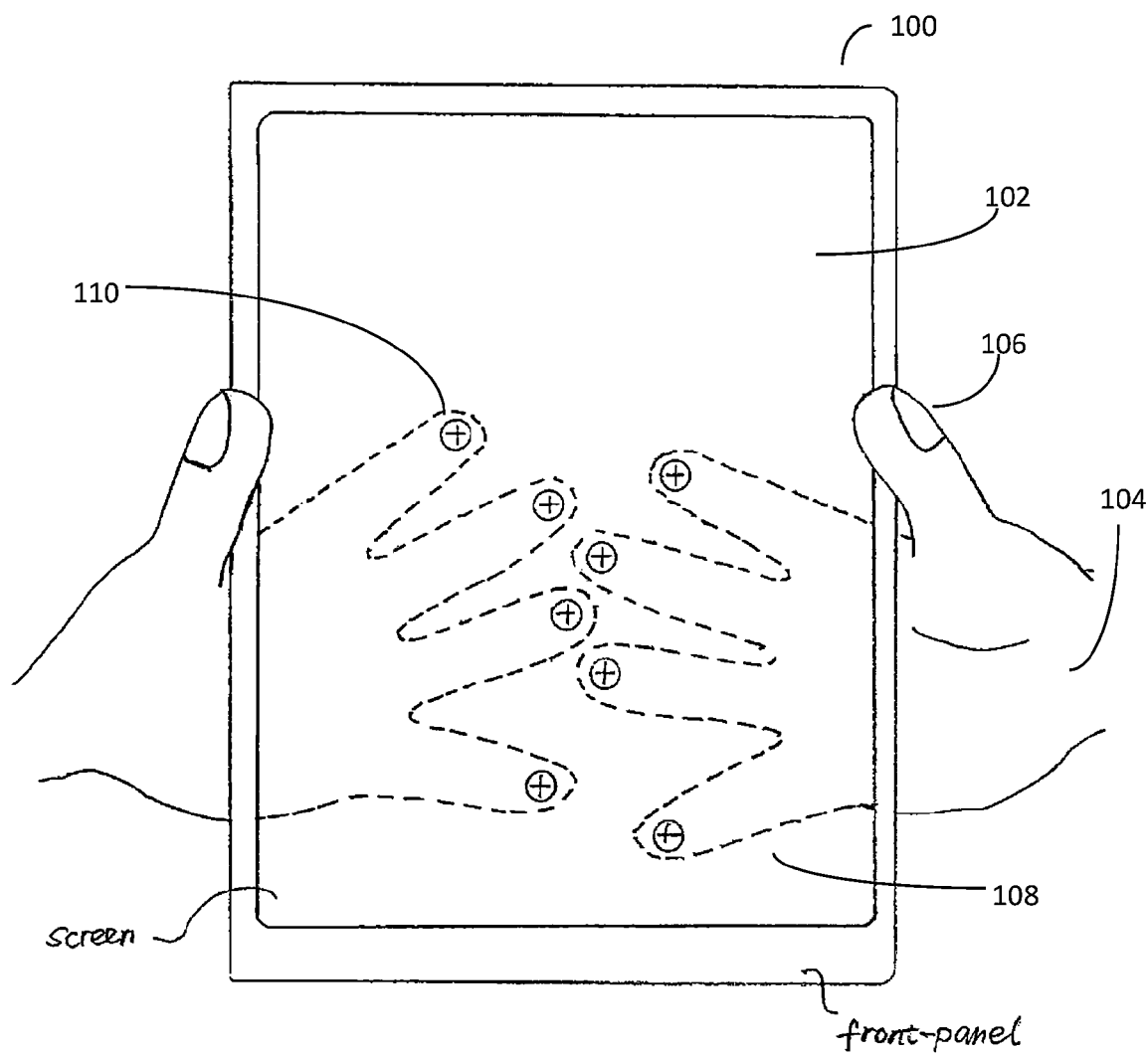
FIG. 1 is a front panel view of the handheld computerized device displaying the position and motion of the fingers holding the back panel.

This configuration, seen from the front, is shown in FIG. 1. As can be seen, the user is holding a handheld electronic pad device, similar to an Apple iPad™ or equivalent (100). The front panel of the device is occupied by a large graphics display screen (102), which may be a bit-mapped graphics display screen. Indeed in some embodiments, the whole front panel screen or front panel may be occupied by this graphics display screen (102). The user is holding the device (100) using his or her hands (104), where the user's thumb (106) is in front of the device, and the user's fingers (108) are behind the device. Although device (100) is not transparent, nonetheless the graphics display screen (102) is shown representing a graphical representation of the user's fingers (108) as well as regions where the user's fingers are apparently touching an invisible surface (110). This (110) corresponds to a real-time finger print image of the tip of the user's finger.

Figure 2:
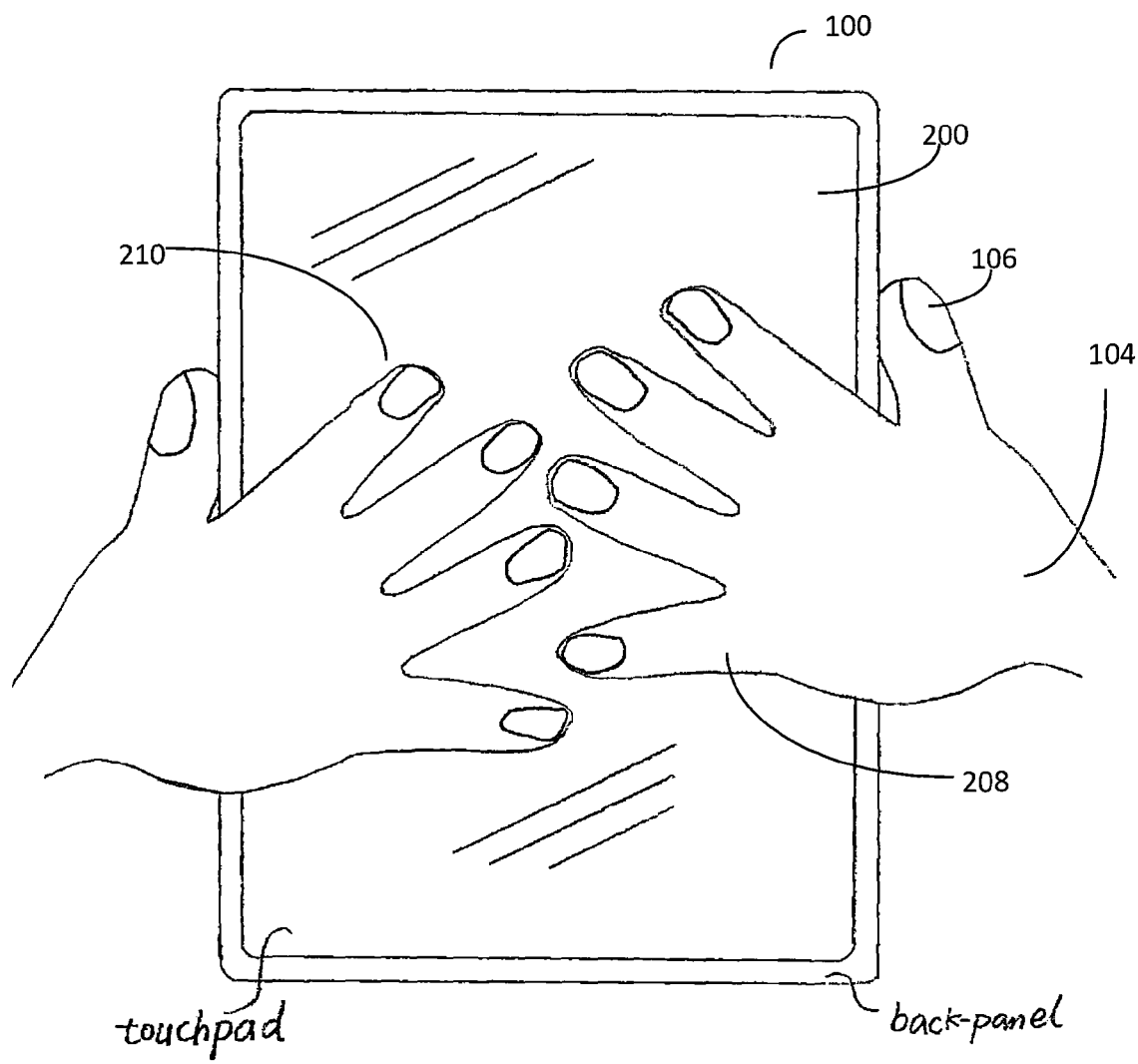
FIG. 2 is a back panel view of the handheld computerized device.

FIG. 2 shows the back of the handheld computerized device (100). In contrast to the front of the device (100), previously shown in FIG. 1, which contained a large graphics display screen, the back of the handheld computerized device does not contain a large graphics display screen, but instead contains a large touchpad (200). As can be seen, the user's fingers are (208) can now be seen positioned above the touchpad with the tips of the user's fingers (210) touching the touchpad.

Note that in some embodiments, this back touchpad can be provided as a retrofit or add-on to a handheld computerized device that otherwise lacks such a back touchpad. Such methods and systems, such as "clip on" back touchpads, are described at more length in parent application Ser. No. 13/223,836, the contents of which are incorporated herein by reference.

Figure 3:
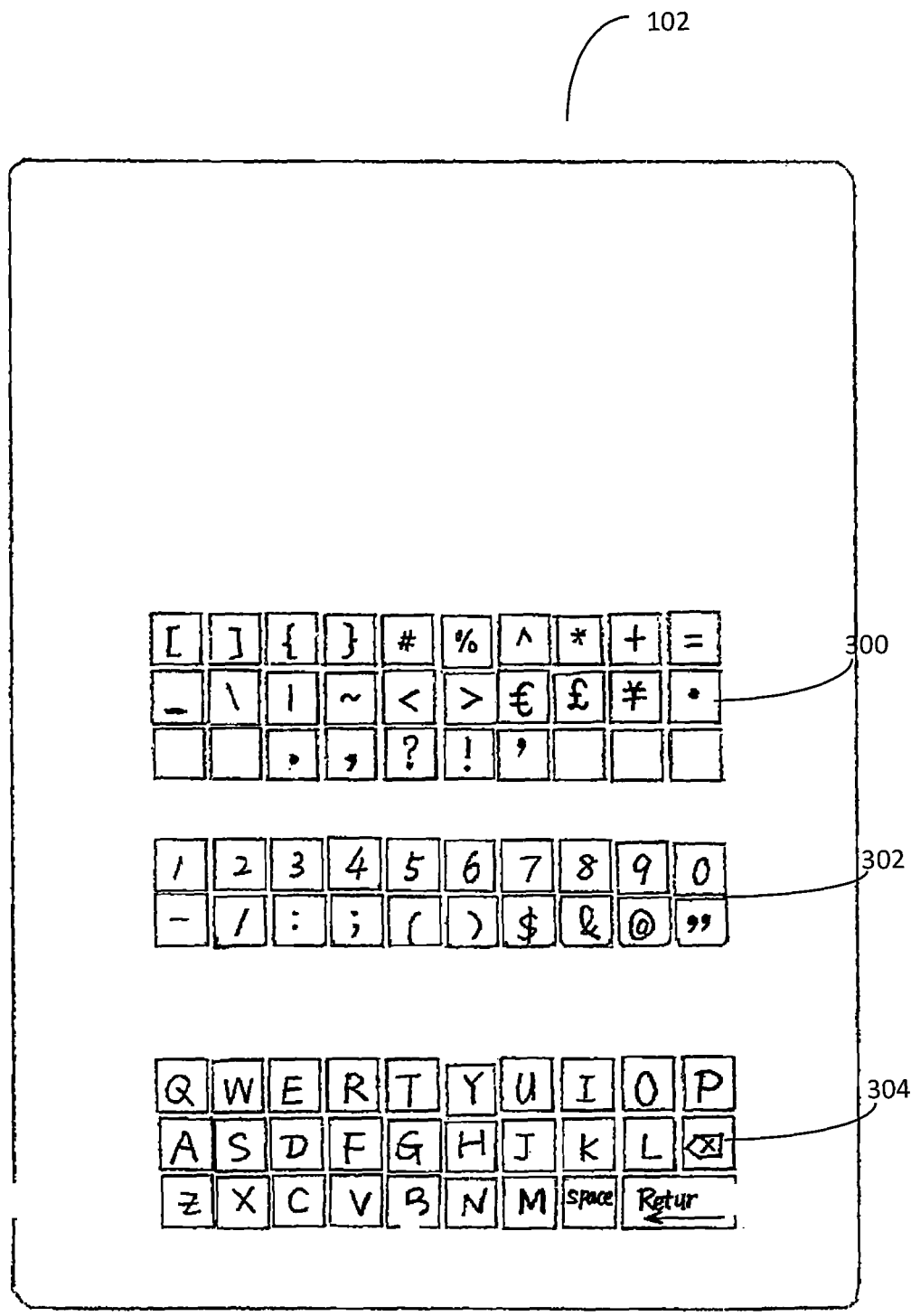
FIG. 3 is a front panel view of the handheld computerized device displaying a plurality of groups of keys.

FIG. 3 shows a drawing of one possible optional "virtual keyboard" being displayed on the large graphics display screen (102) of device (100). In this example, the "virtual keyboard" has a symbol keypad (300), a numeric keypad (302), and a QUERTY keypad (304). Note that in many embodiments, the keys may be drawn in outline or semi-transparent form so as not to obscure any other graphical applications running on the graphics display screen (102).

This scheme allows the user to optionally use a touchpad keypad on the back of the device to input keystrokes and mouse actions, and these will be reflected on the display screen on the front of the handheld computerized device as "virtual fingers" or equivalent. As previously discussed, this virtual keyboard layout on the front panel can be a standard or modified QUERTY keyboard or keypad, a numeric keyboard or keypad (number entry keyboard), or alternatively some less standard keyboard or keypad such as a musical keyboard, a Qwerty, Azerty, Dvorak, Colemak, Neo, Turkish, Arabic, Armenian, Greek, Hebrew, Russian, Moldovan, Ukranian, Bulgarian, Devanagari, Thai, Khmer, Tibetan, Chinese, Hangul (Korean), Japanese, or other type of keyboard. Often this keypad will be a semi-transparent keypad in order to allow the user to continue to view various application programs that are running on the display screen below the virtual keyboard.

Figure 4:
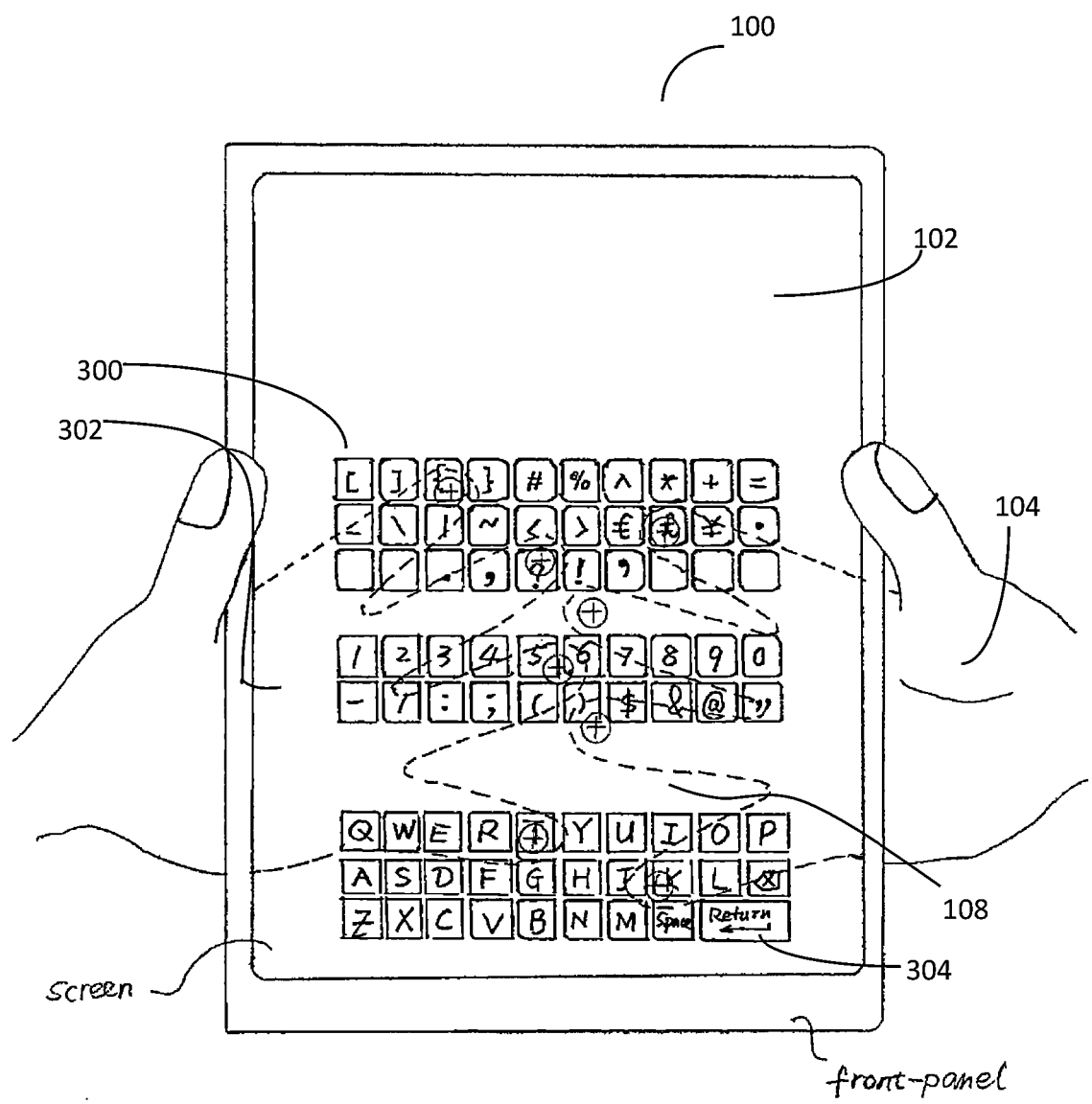
FIG. 4 is a front panel view of the handheld computerized device displaying the position and motion of the fingers holding the back panel and a plurality of groups of keys in the same time.

FIG. 4 shows an example of how a user, typing on a touchpad mounted on the back of the electronic device, may see a graphical representation of his or her fingers (108) on the graphics screen (102) of the device (100), as well as a virtual keyboard layout (300, 302, 304), such as the one previously discussed in FIG. 3. The user's ability to enter in data is thus enhanced because the user can visually judge the distances between his or her fingers (108) and the keypad keys of interest (300, 302, and 304) and move his or her fingers appropriately so as to hit the desired key. The user can also click on hyperlinks, such as link1, link2, etc., or other clickable objects.

Because the user's operating fingers are moved away from the display screen, the fingers will not block the view of the display screen's soft keys, soft buttons, links or other areas. These areas can now be seen more precisely, which in turn allows for more precise operation of the device.

This can be a particularly valuable feature for some of the newer tablet computers, such as the Microsoft Surface™ series, Windows 8, and the like, which can alternate operating modes between a first tablet operating mode designed for traditional touch input, and a second desktop operating mode, derived from legacy desktop operating systems, that is optimized for more precise mouse input. By enabling such tighter control, it becomes more feasible for a user to operate such "Surface" like devices in legacy desktop mode without the need to use a mouse or other hand operated pointing instrument.

Because a front keyboard is no longer necessary, the present invention frees up the space on the device that might otherwise have been used for original keyboard space on the front panel, and creates room for additional displays and applications. The invention makes use of the presently mostly unused back panel space, thus enabling the front display to show substantially larger virtual keys, or virtual keys with more space between them.

The invention can create compelling visual effects, as well as useful visual effects, because the user can see his or her fingers which are holding the back panel, and thus normally blocked from view, being virtually displayed on the front panel along with a virtual (computer generated) keyboard layout display. Because both the user's finger position, finger touch area, finger motion and the virtual keyboard are visible from the front panel, the user finger inputs on the touch panel located on the back panel of the device are both intuitive and easy to use. There will be no learning curve, and no need for special training. The user input methods of the present invention are more precise than traditional touch screen keyboards because these methods remove the obscuring layer between the finger and touchpad, and the operating fingers will not block the view. For small handheld devices such as cell phones and iPhones, the current invention enables the hand that holds the device to perform text input and other commands, hence freeing the other hand for other activities.

Note that although often a virtual keyboard will be presented, alternative data entry points of interest, such as hyperlinks on an internet browser, etc., may also be used according to these methods as well.

Alternatively the layout of a plurality of groups of keys, including numbers, letters, and symbols can be displayed on an area separated from current application on the screen of front panel (much like the traditional separately displayed area often used for soft keys).

One significant advantage of this approach is that devices utilizing the present optional virtual keyboard and virtual fingers approach need not have physical QUERTY keypads or a physical QUERTY keyboard, or any other type of physical keypad such as a physical number entry keypad or physical number entry keyboard. This helps to improve device ergonomics, allow for larger graphics display screens, and also reduces costs.

Figure 5:
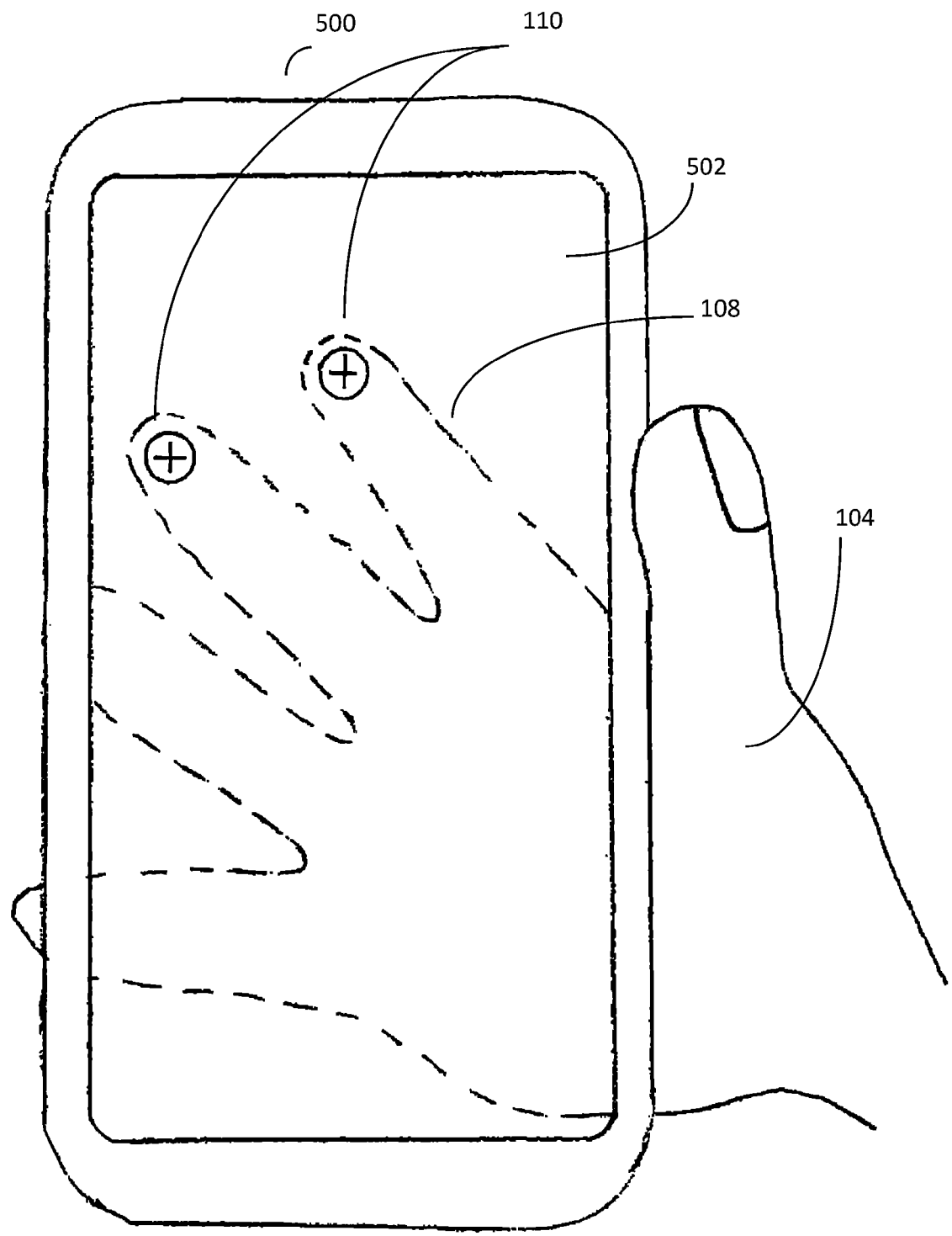
FIG. 5 is a front panel view of a smaller handheld computerized device displaying the position and motion of one finger in contact with the touchpad of the back panel.

FIG. 5 is a front view of a smaller handheld computerized device (500), which may be more of a cellular phone sized device (e.g. an Apple iPhone™ sized device) with a smaller graphics display screen (502) displaying the position and motion of a plurality of fingers (108) in contact with the touchpad of the back panel (110).

Figure 6:
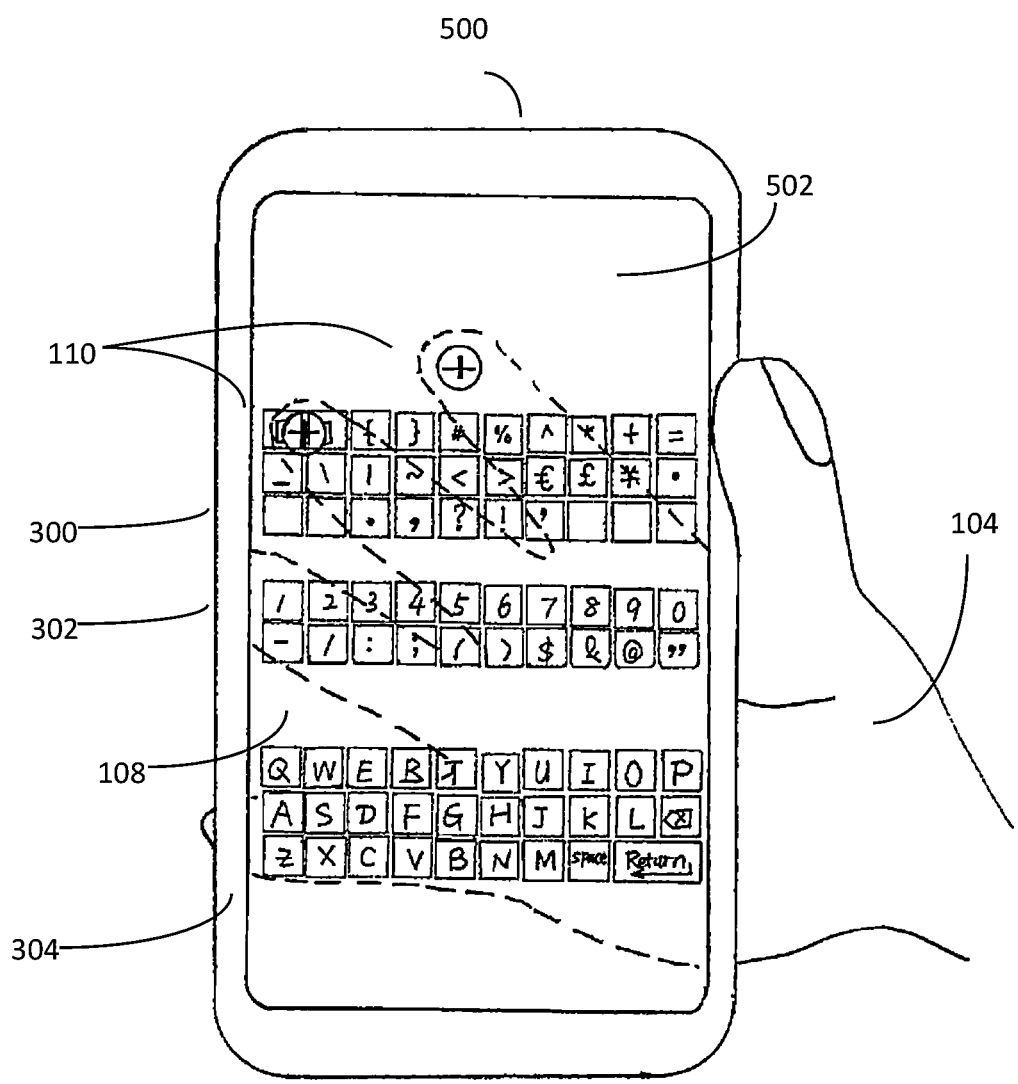
FIG. 6 is a front panel view of a smaller handheld computerized device displaying the position and motion of one finger in contact with the touchpad of the back panel, and a plurality of groups of keys in the same time.

FIG. 6 is a front view of the same smaller handheld computerized device (500) displaying the position and motion of a plurality of fingers in contact (110) with the touchpad of the back panel, and a plurality of groups of keys (300, 302, 304) at the same time.

Figure 7:
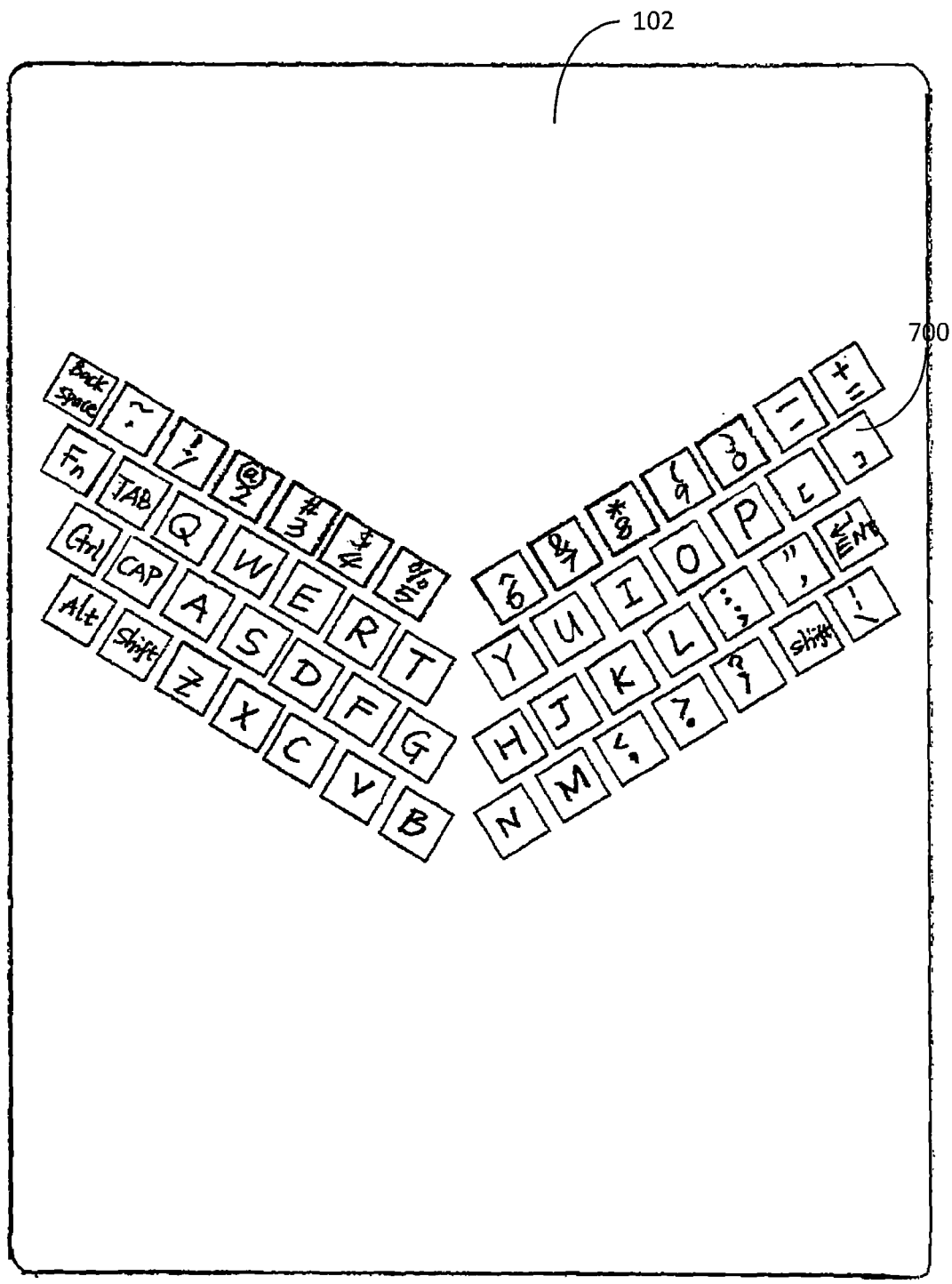
FIG. 7 is a front panel view of the handheld computerized device displaying another embodiment of the layout of keys as the standard keyboard.

FIG. 7 is a front view of the graphics display (102) of the handheld computerized device (100) displaying another embodiment (modified QUERTY keyboard or keypad) of the layout of keys as the standard keyboard.

In one aspect, the invention is a computer-implemented method, comprising: a handheld computerized device, with a screen on the front capable of displaying a graphical user interface, and a touch sensitive back panel (or side panel or other area other than the display screen) user interface, such as a two dimensional touch sensor. For simplicity, this touch sensitive panel, which need not necessarily be flat, and need not necessarily be mounted on the back side of the device, will occasionally be referred to as a touch sensitive back panel, but this use is not intended to be limiting.

The touch sensor will determine the motion of the fingers in real time, and the device's software and processor(s) will use the touch sensor data to compute the real time position and motion of the user's fingers that are touching the touch sensor on the back panel. These "virtual fingers" will then be displayed on the device's graphical user interface on top of a static background where optionally a plurality of groups of keys, including numbers, letters, and symbols (e.g. a virtual keyboard) or hyperlinks may be displayed. By watching the motion of the user's virtual fingers on the virtual keyboard, the user can easily operate the device, and optionally determine precisely where to strike a finger in order to hit an intended virtual key.

Here, the back panel user interface (UI) may be outlined in a distinctive yet non-obstructive color and displayed as a transparent layer over the current applications, hence all the details of current application and back panel UI are shown to the user.

Alternatively, the real time position and motion of the fingers holding the back panel can be displayed on the screen of the front panel.

Alternatively the layout of a plurality of groups of keys, including numbers, letters, and symbols can be displayed on the screen of front panel as background of real time position and motion of the fingers holding the back panel.

Alternatively, the real time position and motion of the fingers holding the back panel can be displayed on the static background of a plurality of groups of keys, including numbers, letters, and symbols, enabling the user to precisely strike a finger on an intended key.

Alternatively, the display of the virtual hand can be creative and artistic. For example, the display can instead show a skeleton, an animal claw, a furry hand, a tattooed hand, etc. to achieve more compelling or amusing effects.

In another aspect, the invention is a computer-implemented method, comprising a handheld computerized device, with a touchpad installed on the back panel, wherein the touchpad is able to sense the touch, movement, and stroke motion of a plurality of fingers. Here the information of the finger motion of one or a plurality of fingers, including the motion type (e.g., touch, movement, and stroke patterns, etc), and motion position, is passed to a virtual keyboard processor (such as a computer processor). The virtual keyboard processor may analyze the finger motion, compare the finger positions with the registered position of the keys (virtual keys) as well as the hyperlinks and other touch buttons of the application program (generically the "user entry area"), and then will decide which item in the user entry area was stroked. The virtual keyboard processor may then invoke the corresponding operation. The virtual keyboard processor can also update the real time image of the fingers, or finger pads, or indeed the user hand(s) on the front screen after each finger motion.

Here, the touchpad may be installed on the back panel of the handheld computerized device, and may be able to sense the touch, movement, and stroke motion of a plurality of user fingers.

Alternatively the information pertaining to the finger motion of a plurality of user fingers, including the motion type (e.g., touch, movement, and stroke action, etc), as well as motion position, can be passed to a virtual keyboard processor.

Alternatively the virtual keyboard processor may analyze the finger motion, compare finger position with the registered position of the keys, determine which key was stroked, and invoke the corresponding operation, Alternatively virtual keyboard processor may update the real time position and motion of the fingers holding the back panel.

In another aspect, the invention is a graphical user interface for a handheld computerized device. This interface may comprise a display of a plurality of groups of keys, including numbers, letters, and symbols. These may be displayed on a graphical user interface on the front panel screen, and indeed this area may occupy the whole screen. Here the content of a graphic user interface is not blocked by applications, and is shown together with the applications;

In still another aspect, the invention is a graphical user interface for a handheld computerized device. This interface comprises a display of the real time position and motion of the fingers holding the back panel. Here the display is on the front panel screen, and in fact may occupy the whole screen. Due to the advantages of this approach, the content of the user's finger position and motion is not blocked by applications, or by the display of groups of keys, including numbers, letters, and symbols.

In another aspect the invention may be a method of assisting user data entry into a handheld computerized device. This handheld computerized device will often comprise at least one touchpad (often being located on a side of the handheld computer that is behind the side of the device that holds the graphics display screen), at least one graphics display screen, at least one processor, memory, and software. Often, however, the handheld computerized device will lack a QUERTY keypad or keyboard, and may even also lack a numeric keypad or keyboard as well. The method will usually comprise displaying at least one data entry location on said at least one graphics display screen of the device. Often this at least one data entry location will be a graphical display of a keyboard or keypad that may be comprised of a plurality of data entry locations. Here, the system will use the touchpad to obtain data on the location and movement of the user's fingers and/or hand. The system may analyze the data on the location and movement of the user's fingers and/or hand according to a biomechanical and anatomical model of a human hand, and will assign data on the location and movement of said user's fingers and/or hand to specific fingers on this biomechanical and anatomical model of a human hand (usually the user's hand). The system may then use this biomechanical and anatomical model of the human hand to compute a graphical representation of at least the user's fingers, and frequently both the user fingers and the user hand(s). The system will then display the graphical representation of at least the user's fingers (and again frequently both the user's finger and hand), on the device's graphics display screen. Thus the distance between the graphical representation of the user's fingers on the graphics display screen, and the data entry location (such as the virtual keyboard) will give information that will help the user properly position his or her fingers and/or hand on the touchpad, which in turn will facilitate data entry.

Figure 8:
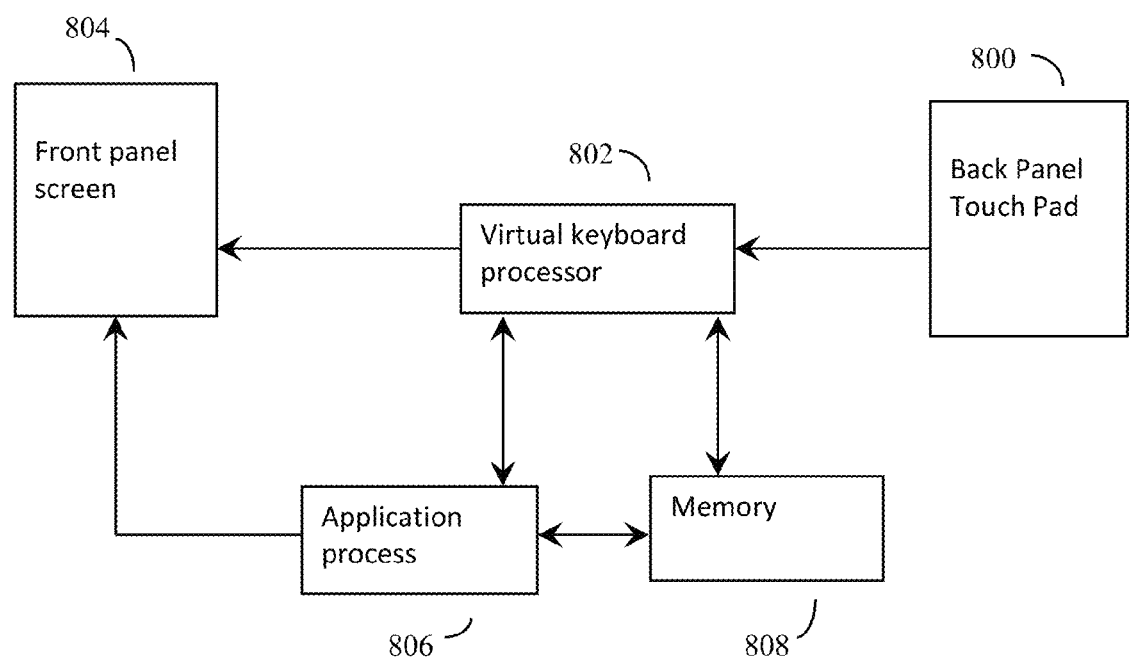
FIG. 8 is a block diagram showing the major components and data flow among the front panel screen, back panel touch pad, virtual keyboard processor, and the device memory.

FIG. 8 shows an overview of the software and hardware that may be used to implement one embodiment of the invention. Here the finger position and motion data are first collected from the back panel touch pad (800), and then passed to the virtual keyboard processor (802). The virtual keyboard processor (which will often be implemented by a combination of software and hardware such as a microprocessor, graphics processor, touchpad controller, and memory) displays the virtual finger position and motion together with the keyboard layout on the front panel screen (804). The virtual keyboard processor also analyzes the finger position and motion information, compares this with the registered position of the keys (or hyper links) and invokes proper operation (806). The keyboard position information can be programmed in a virtual keyboard process, or alternatively can be saved in the system memory (808). The keypress or hyperlink information that the user intends to relay to the applications can be passed to the virtual keyboard controller either through memory, or alternatively through inter-process communications.

Touchpad Technology

In principle, many different types of touchpad technology may be used for this device, including capacitive sensing (exemplified by Gerpheide in U.S. Pat. No. 5,305,017), conductance sensing, resistive sensing, surface acoustic wave sensing, surface capacitance sensing, projected capacitance sensing, strain gauges, optical imaging, dispersive signal technology, acoustic pulse recognition, and bidirectional screen sensing. However in a preferred embodiment, touchpad sensing technology that does not require high amounts of finger pressure, and touchpad technology that is capable of sensing multiple finger positions at the same time may be used. Such an ability to sense multiple finger positions or gestures at the same time is often referred to as multitouch or multi-touch sensing technology.

One good example of an appropriate multi-touch touchpad technology that is suitable for the present invention is exemplified by the Cypress TrueTouch™ projected capacitance family of products, produced by Cypress Semiconductor Corporation, San Jose, Calif. This family of products works by projective capacitative technology, and is well suited for multi-touch applications. The technology, described in the white paper "*Cypress' CapSense Successive Approximation Algorithm*", by Robert Jania, Jan. 17, 2007 (CSA RJO.doc) functions by detecting the presence or proximity of a finger to capacitive sensors. Because this touchpad system senses finger proximity, rather than finger pressure, it is well suited to multi-touch applications because, depending upon the tuning of the capacitance detection circuit, as well as the underlying resilience of the touch pad, various degrees of finger pressure, from light to intense, can be analyzed. Although often used on touch screens, as Jania teaches, this method will in fact function with a broad range of substrates.

Virtual Finger and Hand Position Software (Virtual Keyboard Processor)

Suitable finger and hand position algorithms include the algorithms of Westerman, "HAND TRACKING, FINGER IDENTIFICATION, AND CHORDIC MANIPULATION ON A MULTI-TOUCH SURFACE", Electrical Engineering Ph.D. thesis, University of Delaware, Spring 1999"; and van Nierop, "A natural human hand model", Visual Computing (2008) 24: 31-44. These algorithms enable all fingers on each hand to be identified with good accuracy from touchpad data.

As Westerman teaches, one problem with attempting to create "virtual fingers" is that at best, usually only certain regions of the hand, such as the fingertips and perhaps the palms, can usually be detected by conventional multi-touch sensors (Westerman Abstract, pages xxix-xxx). Westerman teaches how to overcome this issue by bootstrapping from hand-position estimates, which overcomes the invisibility of structures that link fingertips to palms. Westerman further found that suitable algorithms could be obtained by using context-dependent segmentation of the various proximity image constructs, and by parameterizes the pixel groups corresponding to each distinguishable surface contact. He further found that by path-tracking links across successive images, those groups which correspond to the same hand part could be determined, and it was possible to reliably detect when individual fingers touched down and lifted from the multi-touch pad surface. He further found and proposed a number of different combinatorial optimization algorithms that used biomechanical constraints and anatomical features to associate each contact's path with a particular fingertip, thumb, or palm of either hand. His algorithms further operated by assigning contacts to a ring of hand part attractor points, using a squared-distance cost metric, effectively sort the contact identities with respect to the ring of hand part attractor points.

Westerman further described methods for reliable detection of synchronized finger touches, extraction of independent hand translation, scaling, and rotational velocities, as well as finger and hand identifications.

Van Nierop et. al. teach a skeletal linked model of the human hand based software that creates a biology-based (biomechanical and anatomical) model of joint motion and associated set of constraints. Their approach also is based on a software model of the skin that can stretch and bulge in order to accommodate this internal skeleton. Their software models a natural joint axis for four different types of joints in the human hand, as well as takes into account the relative lengths of the underlying hand bone structure, and also accounts for the space occupied by the hand's muscles and skin.

Figure 9:
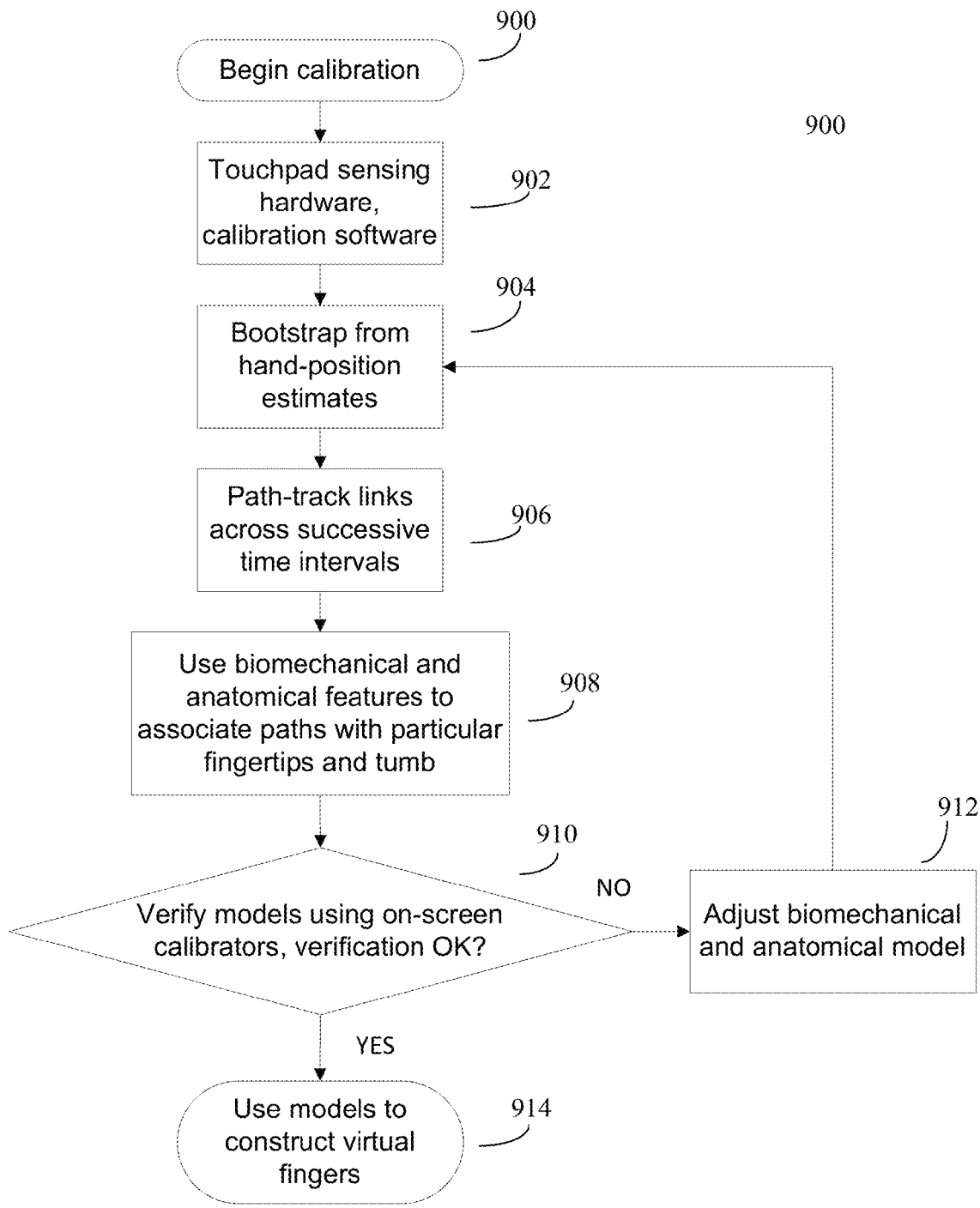
FIG. 9 shows how biomechanical models of hand and finger movement may be calibrated and adapted to help turn the raw touchpad data into an accurate model of the user's hand and finger positions.

FIG. 9 shows an abstraction of how this general type of method may be adapted for the present invention. The method may work with adequate accuracy using only standardized models of hand and finger relationships. Here, for example, the system may perform adequately by only an initial calibration step where, for example, the system invites the user to place his or her hand on the display screen, the system displays various sized hands, and the user is invited to enter in which standardized hand size best fits his or her own hands. The system can then use this data for its various calculations. Even more simply, the system can default to an average hand size for initial use, allowing some degree of functionality to be achieved with no preliminary calibration.

Often however, it will be useful to better calibrate the system by employing one or more active calibration steps. These steps can refine the initial hand model under actual use conditions, and make appropriate adjustment to the various portions of the hand model as will best fit data that has been obtained under actual use conditions.

An example of this active calibration process is shown in FIG. 9. Here the system may invite the user to do an active calibration step, or alternatively the user will voluntarily start an active calibration step, in step (900). To facilitate this calibration step, the system may optionally display one or more targets on the screen, which may be keyboard targets, or alternatively may be specially designed calibration targets specifically designed for the active calibration step. Optional photographic calibration steps are described for FIG. 14.

To reduce complexity, the system may optionally request that the user calibrate one hand at a time, and indeed may request that the user operate the fingers on his or her hand in a manner different from normal typing so as to gather additional data. For example, a user may be requested to first extend a specific finger to a maximum length and press, then to a minimum length and press, then to the extreme left and press, then to the extreme right and press and so on, potentially through all fingers and the thumb on a one at a time basis. It should be apparent that such a data set can then naturally be translated into a reasonably detailed model of that particular user's hand and its capabilities to maintain a number of different configurations. During this process, the system will accumulate touch data using the touchpad sensing hardware and calibration software (902). The system will also make predictions as to the location of the user's hand and fingers by bootstrapping from various hand position estimates (904). Often the system will track the positions of the hand and fingers across successive time intervals to do this, and compute probable finger paths (906). The system will often use its internal model of the user's hand biomechanical features and anatomical features to do this, and to help associate the various projected paths with the user's fingertips and thumb position, which at least during the active calibration process will be known (908). The system will then refine its models of the user's hand biomechanical and anatomical features by comparing the predicted results with real data, and determine if its user hand model is working with sufficient accuracy in step (910). If it is, then this user hand model will then be adopted and used for subsequent user virtual keyboard data entry purposes. If the user hand model is not working with sufficient accuracy, then the system will attempt to adjust the hand model by varying one or more hand-model parameters (912), and often will then continue the calibration process until acceptable performance is obtained.

Thus this calibration software enables the biomechanical and anatomical model of the human hand to be calibrated to more accurately so as to match the biomechanical and anatomical characteristics of a particular user's fingers and/or hand.

The realism of the simulated virtual fingers on the screen may optionally be facilitated by the use of predictive typing models. This approach will be particularly useful when the user is typing text on a virtual keyboard, because the system can scan the previous text that has been entered, and utilize a dictionary and other means, such as the statistical distribution of letters in the particular language, to make educated guesses as to what letter is going to be typed next. This educated guess can then be used to supplement the touchpad data as to last fingertip position and movement to tend to direct the appearance of the simulated finger towards the logical next key. Because this system will occasionally tend to guess wrong, however, the user may find it useful to adjust this predictive typing "hint" to various settings depending upon the user and the situation. Thus a user who is an experienced touch typist and who tends to type both fairly quickly and fairly accurately will tend to find the predictive typing hints useful, because the predictive approach will tend to work well for this type of user. On the other hand, a user who is more of a slow and uncertain "hunt and peck" typist may find the predictive approach to be less useful, and may wish to either reduce the strength of the hint or potentially even turn the predictive typing "hint" off altogether.

Figure 10:
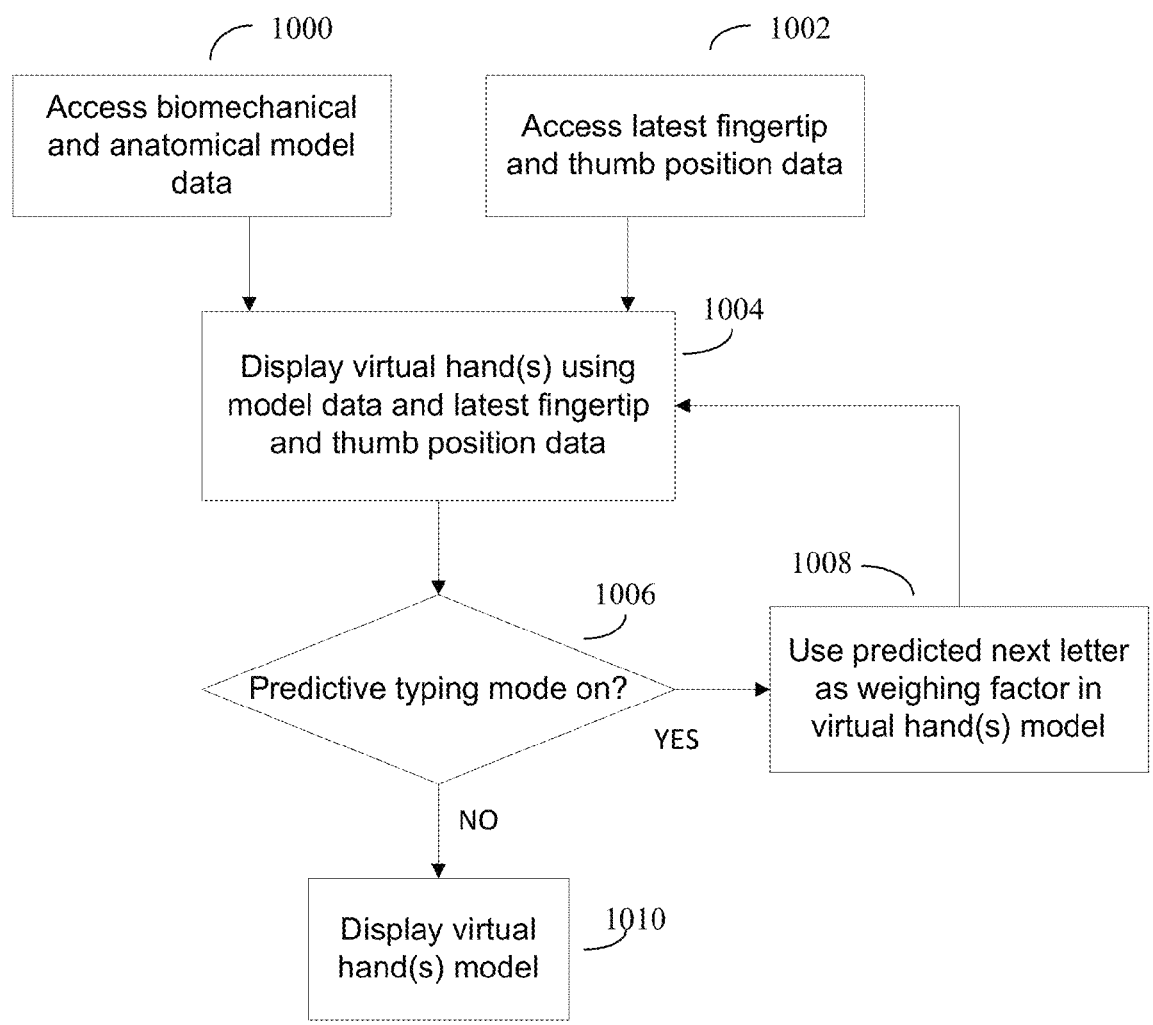
FIG. 10 shows how predictive typing methods may be used to improve the accuracy of the appearance of the virtual hand and fingers while typing.

A diagram of this predictive typing "hint" approach is shown in FIG. 10. In a predictive typing system, the software will first access both the biomechanical and anatomical model data for the user's hands (1000), and the latest fingertip and thumb position data from the touchpad sensors (1002). The system will then use this information to display the user's virtual hands and fingers on the device's display screen (1004). If a predictive typing mode is on (1006), then the system will attempt to deduce (based upon typing speed, as well as the user's consistency in typing speed, and context) what is the most probable letter or letters that the user is likely to type next. The system will also attempt to predict the most probable finger or fingers that the user will use to type this most probable letter (1008). For example, if the user is typing quickly and consistently, and the context of the word or sentence indicates that a vowel such as "e" is likely, then the system may use this factor in its analysis of the somewhat noisy finger position data from the touch sensor to increase the probability that the user's left index finger (often used to type "e" on a keyboard, and which in-fact may not be registering on the touch pad because the user has lifted the left index finger to move to strike the "e" key), is moving towards the "e" key. When used properly, such predictive typing algorithms can help increase the illusion that the user is looking through the display and onto his or her hands below the display. Conversely, if the predictive typing mode is turned "off" (or set to reduced intensity) (1010), then the system will not take the probable next letter into account in its display of the user's hand and fingers.

The efficiency of the predictive typing can be further enhanced by incorporating the user's history of finger use for each particular key. For example, one user may have a strong tendency to use the right index finger to type the keys "H" and "J", and as another example the same user may have a tendency to user his or her left pinky finger to type the letter's "A" and "Z". Here the system may observe the individual user's typing patterns over time, either as part of an initial calibration step, or later (and even possibly continually) while monitoring the user's typing patterns, and use the user's individualized finger-to-letter correlation habits as part of the predictive typing algorithm.

Thus this predictive typing software enables the computerized device to compute the graphical representation of at least the user's fingers (and often the user's fingers and hands) with better precision by additionally using keystroke predictions, in addition to the data on the location and movement of the user's fingers and/or hand obtained using the touchpad.

In order to improve the realism of the virtual fingers, additional "finger hover" algorithms can also be used. As used in this specification, "finger hover" means highlighting or otherwise graphically altering the appearance of a virtual key on a virtual keyboard whenever the system believes that the user's finger is either hovering above that virtual key, or about to strike that virtual key. For this type of algorithm, use of touchpads that can sense relative finger proximity to the touchpad surface, such as projective capacitative technology touchpads, can be particularly useful.

The sensors and algorithms that detect relative finger-height above a surface can be tuned to various degrees of sensitivity, and indeed this sensitivity level represents an important engineering tradeoff. If the touchpad is tuned to too high a sensitivity, then it will tend to generate spurious (false) signals, and also lack precision as to precisely where on the touchpad a finger is about to land. If the touch pad is tuned to a lower sensitivity, then the touchpad will only tend to detect fingertips that are exerting a considerable amount of pressure on the touchpad surface.

Although many prior art touchpads tend to use a continual level of touchpad sensitivity at all times, for the "finger hover" option described in this specification, use of a dynamic or variable level of touchpad sensitivity can be advantageous. For example, to detect finger hovering above a key, a touchpad might first operate at a normal level of sensitivity until it detects that a fingertip within strategic striking distance of a particular key has left the surface of the touchpad. At this point, the in order to detect "finger hover" above the key, the touchpad circuitry might temporarily reset its sensitivity to a higher level, designed to more precisely detect when the user's finger is hovering above the key. If the higher level of touchpad sensitivity detects the fingertip proximity, the key can be highlighted. If the higher level of touchpad sensitivity does not detect the hovering fingertip, then the key will not be highlighted. After a short period of time, often on the order roughly a tenth of a second, the touchpad can then be reset to the normal level of sensitivity to more precisely determine if the finger has then actually touched the touchpad, or not.

Figure 11:
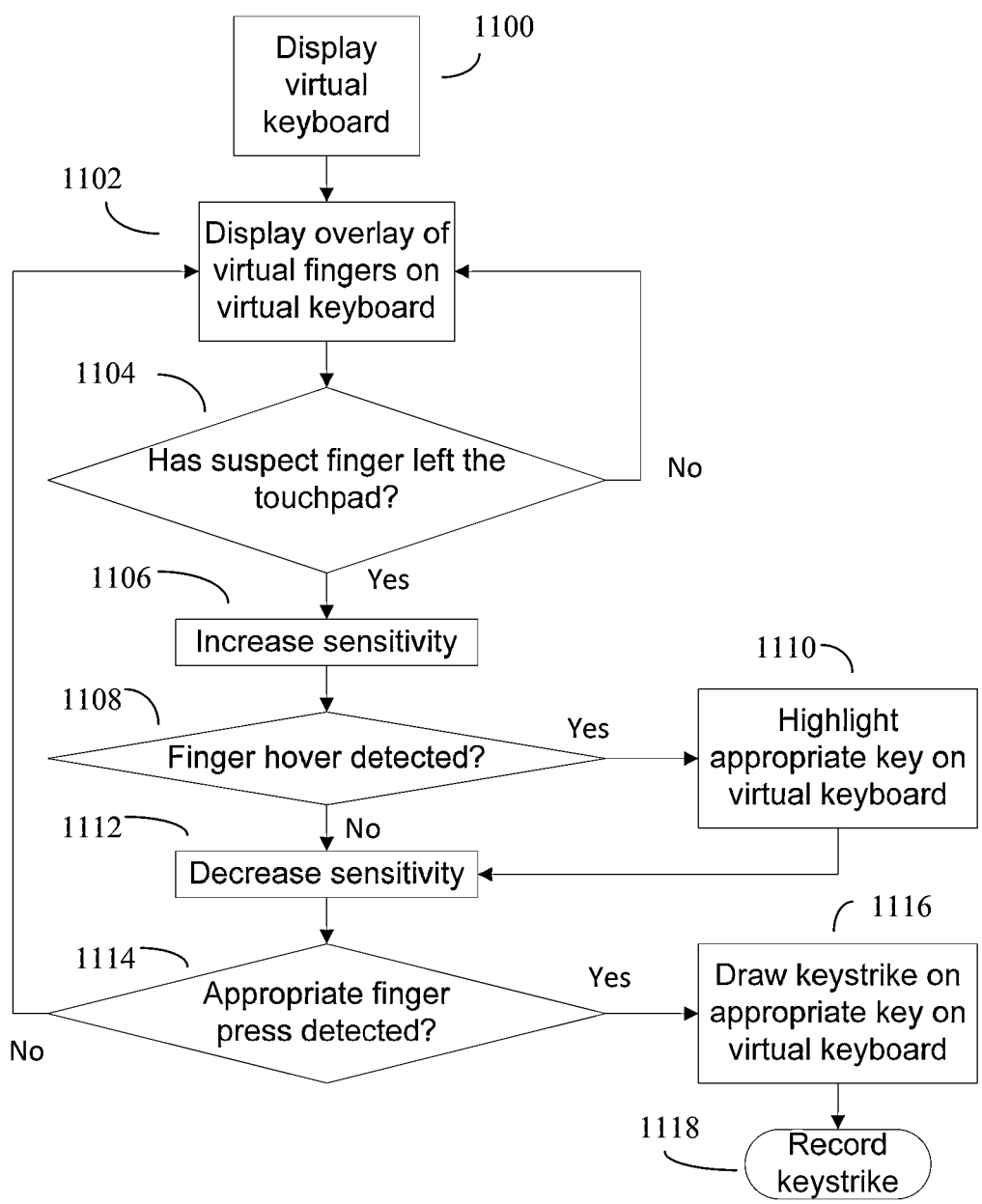
FIG. 11 shows how dynamic changes in touchpad sensitivity may, for finger proximity touchpads, assist in highlighting the virtual keys about to be struck by a user while typing on the virtual keyboard.

FIG. 11 shows an example of an algorithm to detect and indicate "finger hover". Here the system displays the virtual keyboard (1100), as well as an overlay of the user's virtual fingers on or near this virtual keyboard (1102). When the system detects that a finger, suspected of being a finger about to press a key due to the finger's proximity to the key and or predictive typing considerations, leaves the touchpad (most likely because the user has raised the finger above the touchpad in preparation for striking the virtual key), (1104) the system will momentarily turn the touchpad finger proximity detector to a higher level of sensitivity (1106), and the software will specifically look to see if finger hover over the suspected key or keys can be detected (1108). If so, and a finger hover signal can be detected over this suspected key, then this key will be highlighted to help guide the user (1110). After a period of time that will not normally exceed about a tenth of a second, the system will once again lower the sensitivity of the finger proximity detector down to the normal level (1112), in order to precisely detect if the finger is about to strike the key (1114). If the touchpad, now operating at normal sensitivity, now detects that the virtual key has been struck by the user, the system will appropriately indicate the keystroke on the virtual key board by further graphical changes to the key (1116) and optionally may issue an audible key-press or key-click sound as well to give further feedback to the user.

More generally, this approach allows at least one data entry location (key) to be highlighted on the device's graphics display screen whenever the computerized device determines that at least one finger on said user's hand has left the touchpad, and the position and motion history of the finger is consistent with an ability of that finger to strike a position on the touchpad that is consistent with the location of the data entry location (key) on the graphics display screen.

Graphical Representation of the User's Human Hand(s) and Fingers

Once the computerized device has obtained data from the touchpad, as well as any additional predictive typing data, hover detection method data, calibration data, and the like, and has updated its internal biomechanical and anatomical model of the user's hand or hands (including the fingers) to reflect this new data, then the system can utilize this biomechanical and anatomical model of the user's hand or hands to compute a graphical representation of at least the user's fingers, and often the user's hand and figures, suitable for display on the device's graphics display screen.

A life-like graphical representation of the user's hand and fingers is not necessary. Often, a more shadow-gram like or cartoon-like two-dimensional model (or representation) of the user's hand and fingers will be all that will be necessary. Often these two-dimensional representations of the user's hand and fingers need not contain much, if any internal detail. Rather, these representations, may for example, look much like a translucent gray or other colored shadow projection of the user's hands and fingers on a surface. Here, the sharpness and the contrast and the detail of the user's hands and fingers need only be sharp enough, and have enough distinguishing contrast from other areas of the display screen, so as to enable the user to accurately place his or her hands and fingers on the appropriate virtual buttons or virtual keyboard that is being shown in the graphical display. More fanciful or artistically inspired hand representations are also discussed later in this specification.

Figure 12:
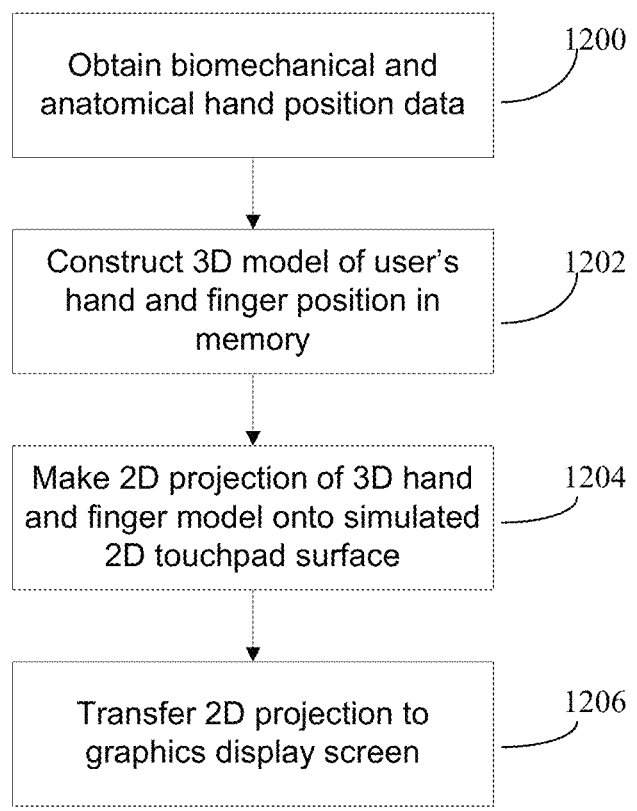
FIG. 12 shows a method to generate images of the virtual hand and fingers on the device's graphics display screen.

Many ways to graphically represent the user's hands and fingers, or at least the user's fingers, are possible. One way is shown in FIG. 12. Here, based upon the biomechanical and anatomical model of the human hand(s) (1200), and optionally specific data on the location and movement of the user's fingers and hand based on the touchpad data (as well as any additional data from predictive typing software, or hover detection) a three-dimensional virtual model may be constructed in the device's memory that depicts the user's hand(s) and fingers (1202).

Based upon this 3D model, a two-dimensional projection of the general outlines of the user's hand and fingers may be made upon a mathematical surface that corresponds to the surface of the touchpad (1204). This projection may be in the form of a hand and/or finger outline, or alternatively a virtual hand and finger shadow may be produced. This projection can then be combined with the any other data that is being sent do a memory buffer or graphics display buffer for the display screen of the device, and then displayed to the user (1206).

Thus in one embodiment, the graphical representation of at least the user's fingers (and often both the user's hand and fingers) on the graphics display screen may be done by using the previous assignment of the data on the location and movement of the user's fingers and/or hand(s) to specific fingers on the biomechanical and anatomical model of said human hand(s) to create a three dimensional model of the user's hand(s) and fingers in the computerized device's memory. Next, a two-dimensional projection of this three dimensional model of the user's hand(s) and fingers in memory can be made. Here the two-dimensional projection can be on an imaginary plane that corresponds in both distance and orientation from the model of the user's fingers to the touchpad. Thus if, for example, the real user's finger is ¼" above the touchpad, then the distance between the three dimensional model of the user's finger and the imaginary plane that corresponds in distance and orientation to the touchpad will also be ¼". This two-dimensional projection on the imaginary "touchpad" plane (virtual touchpad) can be used to generate the graphical representation of at least the user's fingers on the graphics display screen, and often the user's fingers and hand(s) as well.

Alternatively, in a less computationally intensive scheme, a two dimensional model of the user's hands and fingers may be manipulated to best fit the previously discussed hand and finger position and motion data, and this two dimensional model then used for the graphical representation.

This two dimensional model may be further user selected according to the user's hand size, and indeed may be calibrated by asking the user to place his or her hand on the touchpad, thus allowing the system to sense the dimensions of the user's hand directly.

Figure 13:
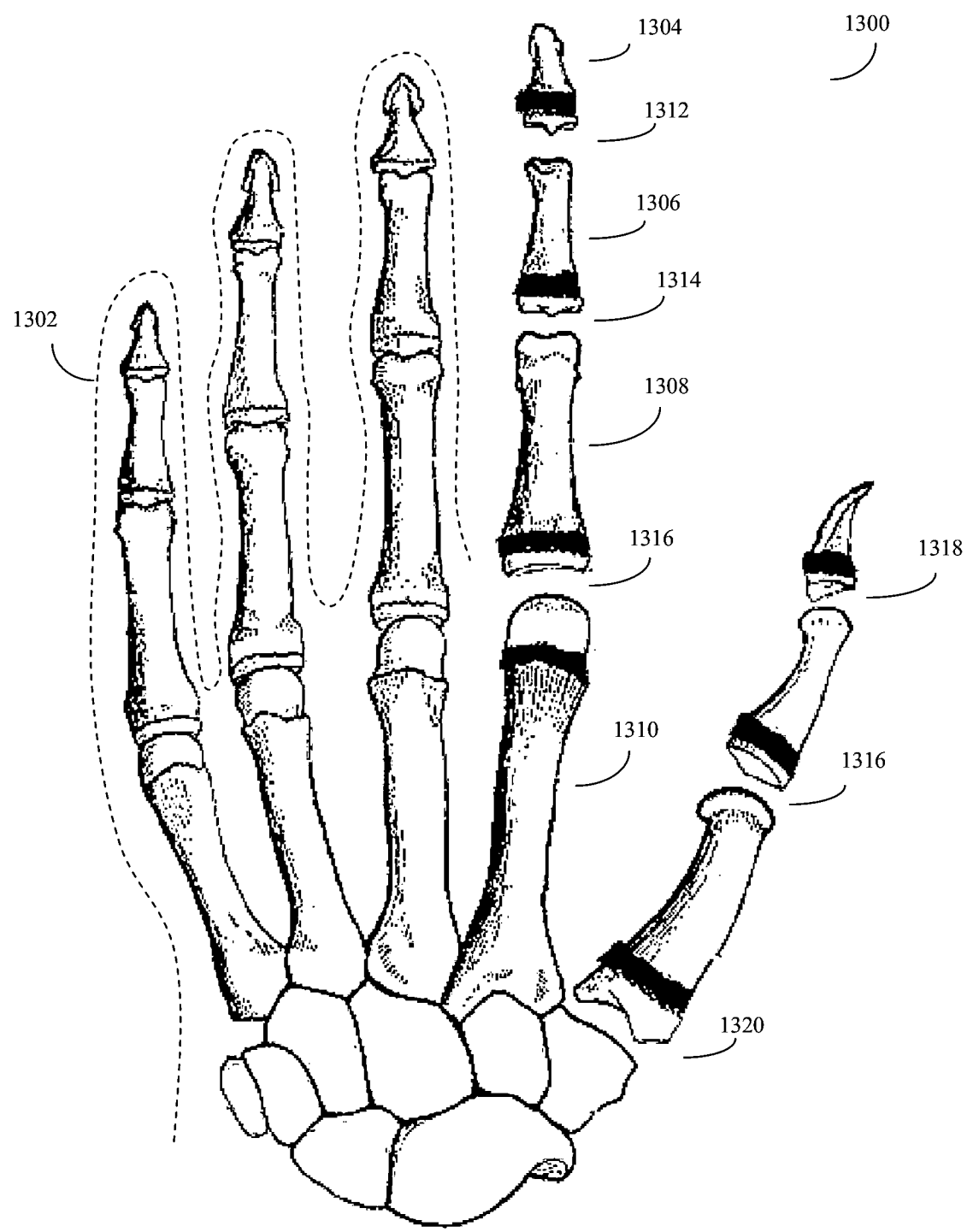
FIG. 13 shows a biomechanical and anatomical model of the human hand, showing the internal skeletal structure with a skin overlay.

FIG. 13 shows more details of one embodiment of the biomechanical and anatomical model of the human hand. This illustration, based in part on FIG. 234 from the 1918 edition of Gray's anatomy of the human body, (obtained from http://www.bartleby.com/107/illus234.html) shows the major bones of the hand, with the bones of the index finger and thumb separated in order to allow the joints to be better visualized.

In this figure, the internal skeletal structure of the hand (1300) is shown, along with an outline of the skin on the left side of the hand (1302). The bones of the fingers are termed the distal phalanges (1304), the intermediate phalanges (1306), the proximal phalanges (1308) and the metacarpals (1310). The thumb lacks the intermediate phalange.

Here the various finger joints are termed the distal inter-phalangeal joint (dip) (1312), the proximal inter-phalangeal joint (pip) (1314), and the metacarpophalangeal joint (mcp) (1316). The thumb lacks the distal inter-phalangeal joint (dip), and instead has the interphlangeal joint (ip) (1318) as well as the carpometacarpal (cmc) joint (1320). For the highest degree of accuracy, often it will be useful to replace the default parameter values of at least the lengths of these various bones with actual user hand parameters. In general, the more accurately the various default parameters of the biomechanical and anatomical model of the human are to the actual user hand parameters, the better. In some embodiments, even the range of joint motion may also be experimentally determined, and used to replace one or more joint motion range default parameters.

In some embodiments, to improve accuracy (that is to replace standard human hand biomechanical and anatomical model default parameters with actual user parameters), it will be useful to acquire an image of the user's hands, and to employ various image processing and analysis techniques to analyze this image of the user's one or more hands to better estimate the relative length of the various bones of the user's hands. Indeed, in the event that the user has lost one or more fingers, the system can then use this information to make corresponding changes in its biomechanical and anatomical model of the human hand.

Figure 14:
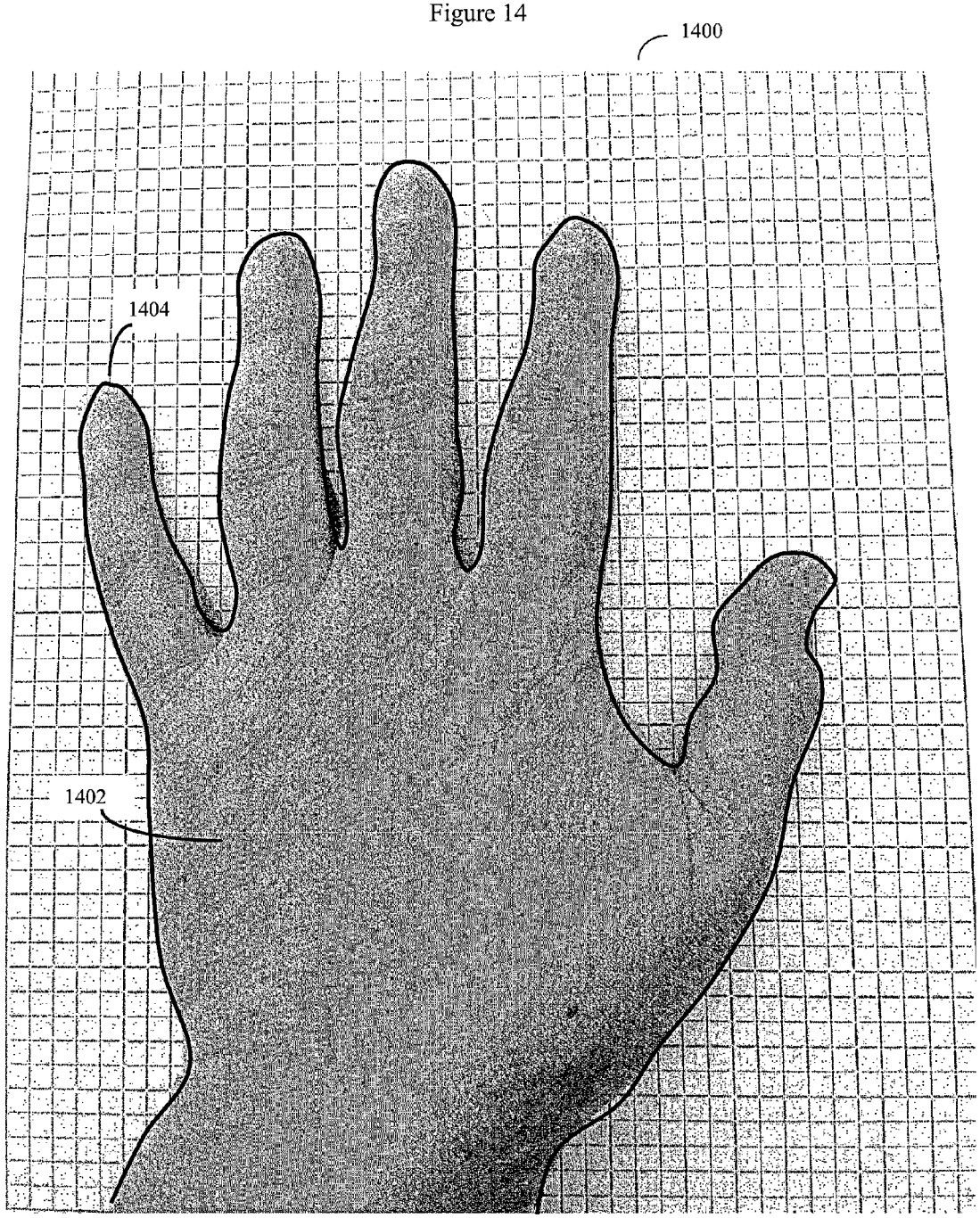
FIG. 14 shows how the user's hand or hands can be photographed by the device's camera or other camera, and this image information can be used to refine the default parameters of the biomechanical and anatomical model of the user's hand.

FIG. 14 shows how the user's hand or hands can be photographed by the device's camera or other camera, and this image information can be used to refine the biomechanical and anatomical model of the user's hand. In acquiring such images, often it is useful to have the system provide a standardized background, such as a series of distance markings, graph paper, and the like (1400) in order to better calibrate the image of the hand and correct for any distortions. This standardized background can additionally contain various color, shades of gray, and resolution test targets as well. The background can be conveniently provided by, for example, electronically providing one or more background image sheets (e.g. a jpeg, png, pdf or other image file) for printing on the user's printer.

In one embodiment, the user may put each hand on this background, and take a photo of the hand(s) (1402) with either the computerized device's camera or other camera. This image can then be analyzed, preferably by an image analysis program. The background image will help correct for any image distortions caused by different camera angles, and the like.

This user hand image analysis may be done onboard the user's handheld computerized device, but it need not be. In an alternative embodiment, the user may upload one or more images of the hand taken by any imaging device to an external image analyzer, such as a remote internet server. In either event, the image analyzer will analyze the user's skin appearance (1404), deduce the most probable lengths one or more bones of the user's hand, such as the user's various finger and thumb bones, and send this data or other data to correct the default biomechanical and anatomical model of the user's hand(s) back to the user's computerized device.

Alternatively, at least with more sophisticated and possibly next-generation touchpads capable of providing position details for a large number of contact points, the user may calibration the touchpad by firmly pressing part or all of the user's hand on the touchpad, and allowing a highly capable touchpad to in turn precisely render the resulting handprint. A compute program can then analyze the touchpad derived handprint, extract parameters such as finger joint positions, probable finger and hand bone lengths, and the like and derive the same information as previously discussed for the photographic calibration step above.

Alternatives or Supplements to the Touchpad

In an alternative embodiment, information on the user's finger placement can be obtained using optical methods. Thus in an alternative embodiment, the touchpad sensor may be an optical method such as one or more cameras. These camera(s) can keep track of the user's hand and finger positions, and this data can then be fed into the biomechanical and anatomical model of the human hand(s) to compute a graphical representation of at least the user's fingers as described previously.

Real Time Video Updating

In another embodiment, image information may also be used to refine the biomechanical and anatomical model of the user(s) hands in real time while the user is using the device.

Figure 15:
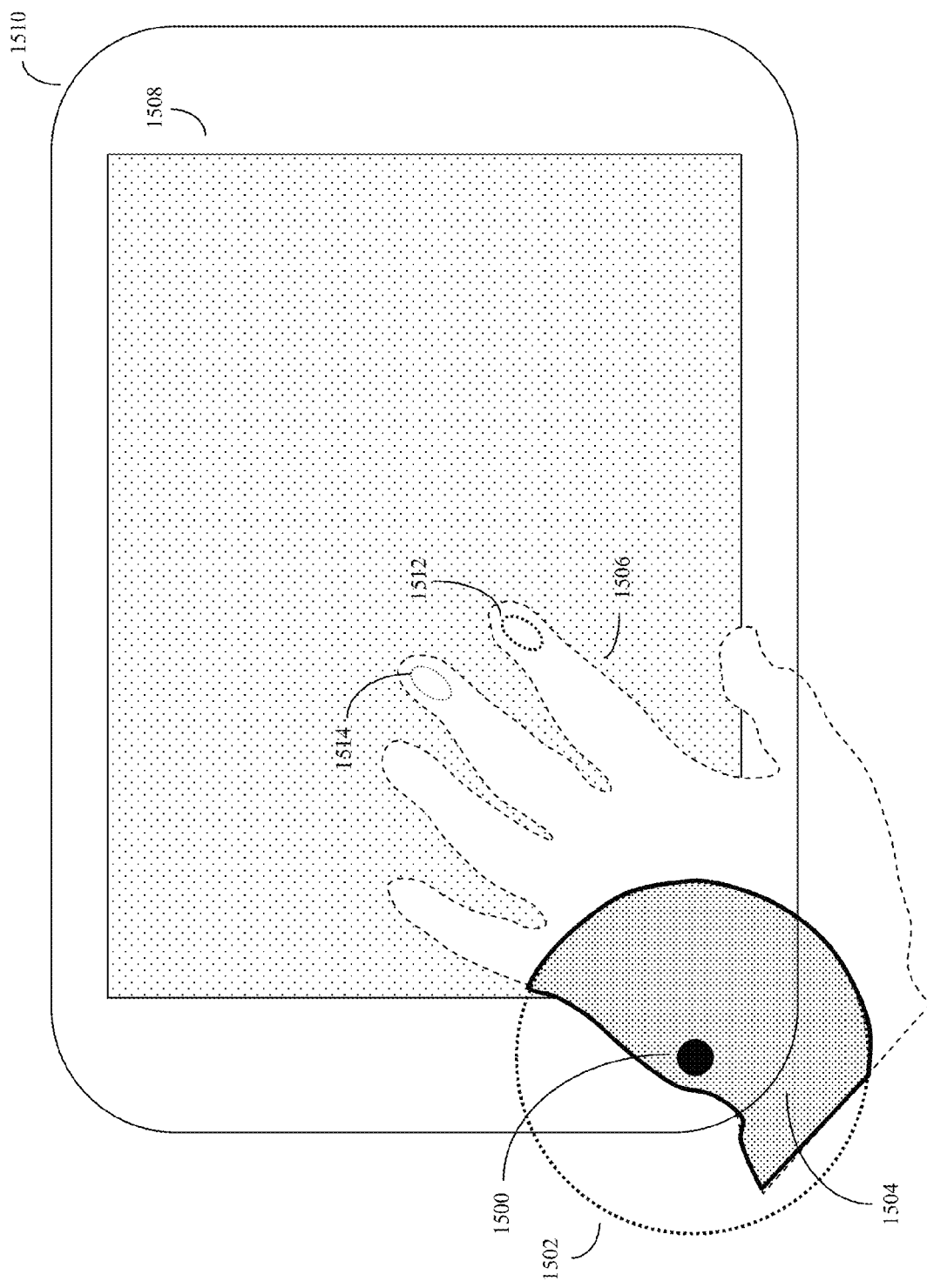
FIG. 15 shows how the device camera may be used to obtain a partial image of the user's hand while using the device's touchpad, and this information also used to update and refine the biomechanical and anatomical model of the user's hand.

FIG. 15 shows how a rear mounted device camera (1500), which often will have only a very limited field of view at close range 1502), may nonetheless be used to obtain a real time video image of part (1504) of the user's hand (1506) while the user is using a rear mounted touch pad (1508) using a touch pad mounted on the back of the computerized device (1510). At the same time, touch pad data gives the position of the user's index finger (1512) as a strong touch pad signal, and the position of the user's middle finger (1514) as a weaker touch pad signal (1514). Note that although the only portion of the hand (1504) that can be directly visualized by video camera (1500) does not contain any image information at all pertaining to the position of the user's fingers, the image information (1504) does provide an important series of further constraints upon the biomechanical and anatomical model of the user's hands. Thus this partial hand image information, in conjunction with the touch pad data (1512), (1514), and optionally with a refined biomechanical and anatomical model of this user's hand (if available) obtained in FIG. 14, above, can significantly improve the accuracy of the depiction of the user's hand and fingers.

Other Variations.

In some embodiments, for amusement or artistic purposes, the user may not wish to have a fully accurate anatomical model of the user's hand displayed on the screen, but may instead prefer a variant, such as a realistic depiction of a "monster hand" with fingers being replaced by claws, fur, or pads, and the like, or of a skeleton hand that shows the underlying biomechanical and anatomical estimation of the user's hand bones as per FIG. 13.

As an option, the system software may also be configured to render the user's fingers and hands as various hand variants. Generally these hand variants will still provide realistic information pertaining to the user's hand and finger placement, but will also provide this information as various user artistic options that often can be customized according to user preference.

Trademarks: iPAD™ and iPhone™ are trademarks of Apple Inc., Cupertino Calif. Surface™ is a copyright of Microsoft Corporation.

The invention claimed is:

1. A method of creating a virtual image of at least portions of the user's hand or hands while operating a handheld computerized device, said handheld computerized device comprising at least one touchpad, at least one graphics display screen, at least one image sensor configured to photograph at least part of the region of space proximate said at least one touchpad, but not configured to photograph the surface of said touchpad, at least one processor, memory, and software, said method comprising:

obtaining data on the location and movement of the user's fingers and/or hand using said touchpad, said user's fingers and/or hand being positioned in an arbitrary manner with respect to said touchpad when contacting said touchpad, said data not being associated with an image of the user's fingers from said image sensor, said at least one image sensor comprising at least one video camera;

said touchpad being located in a location of said handheld computerized device that is different from the location of said at least one display screen;

analyzing said data from said touchpad on the location and movement of said user's fingers and/or hand according to a model of a human hand, and assigning said data on the location and movement of said user's fingers and/or hand to specific fingers on said model of said human hand, thereby making predictions as to the location of the user's hand and fingers;

using said model of said human hand, and said predictions of the location of the user's hand and fingers, to compute a graphical representation of at least said user's fingers;

further using images of portions of the user's hand or hands that do not contain images pertaining to the position of the user's fingers to further supplement or refine said model of said human hand; and displaying said graphical representation of at least said user's fingers on said at least one graphics display screen of said handheld computerized device.

2. The method of claim 1, wherein prior to subsequent use, the model of a human hand is calibrated in a calibration process by obtaining at least one full or partial image of the user hand or hands.

3. The method of claim 2, further analyzing said at least one full or partial image of the user's hand or hands to compute one or more user parameters of said model of said human hand;

and using said one or more user parameters of said model of said human hand to replace one or more default parameters of said model of said human hand.

4. The method of claim 3, wherein said one or more user parameters comprise the length of at least one or more distal phalanges or intermediate phalanges or proximate phalanges or metacarpals of said user's hand or hands.

5. The method of claim 1, wherein the position of at least the distal phalanges or fingertips of said user's fingers are not photographed by said at least one video camera when said user is touching said touchpad;

wherein said model of a human hand is further supplemented or refined by real-time video images of at least non-finger regions of said human hand obtained from said at least one camera.

6. The method of claim 1, wherein said touchpad is located on a side of said handheld computerized device that is different from the side of said handheld device that holds said at least one graphics display screen.

7. The method of claim 1, wherein said touchpad is capable of detecting the proximity of said user's fingers above the surface of said touchpad;

wherein said touchpad is capable of distinguishing the distance between said user's fingers and the surface of said touchpad when said distance is greater than zero.

8. The method of claim 1, in which said software comprises calibration software to enable the model of said human hand to be calibrated to the touchpad data to more accurately match biomechanical and anatomical characteristics of said user's fingers and/or hand; and wherein said biomedical and anatomical characteristics comprise at least the length of the user's fingers, thereby allowing said model of said human hand to determine the length of said user's fingers for a plurality of different hand configurations.

9. The method of claim 1, used to assist user data entry into said handheld computerized device, further comprising:

displaying at least one data entry location on said at least one graphics display screen of said handheld computerized device;

wherein said at least one data entry location is a graphical display of a keyboard or keypad comprised of a plurality of data entry locations, or wherein said at least one data entry location is a hyperlink.

10. The method of claim 9, in which said at least one data entry location is highlighted on said at least one graphics display screen whenever said computerized device determines that at least one finger on said user's hand has left the touchpad and the position and motion history of said at least one finger is consistent with a capability said at least one finger on said user's hand to strike a position on said touchpad that is consistent with the location of said at least one data entry location on said at least one graphics display screen;

wherein said highlighting commences before said at least one finger has struck the next position on said keypad.

11. The method of claim 9, in which said at least one data entry location comprises alphanumeric letter data entry locations, and wherein said software comprises predictive typing software configured to deduce the most probable letter or letters that the user is likely to type next, and the most probable finger or fingers that the user will use to type this most probable letter, and said computerized device utilizes keystroke predictions made by said predictive typing software, along with said data on the location and movement of said user's fingers and/or hand using said touchpad, to compute the graphical representation of at least said user's fingers.

12. The method of claim 9 wherein either the graphical representation of at least said user's fingers on said at least one graphics display screen is semi-transparent so as to enable the graphical display and said user's fingers to be simultaneously observed; or wherein said at least one data entry location is a graphical display of a semi-transparent keyboard or semi-transparent keypad, thus allowing details of a current application running on said graphics display to be visualized along with said semi-transparent keyboard or semi-transparent keypad.

13. A method of creating a virtual image of at least portions of the user's hand or hands while operating a handheld computerized device, said handheld computerized device comprising at least one touchpad, at least one graphics display screen, at least one image sensor configured to photograph at least part of the region of space proximate said at least one touchpad, but not configured to photograph the surface of said touchpad, at least one processor, memory, and software, said method comprising:

further displaying at least one data entry location on said at least one graphics display screen of said handheld computerized device;

obtaining data on the location and movement of the user's fingers and/or hand using said touchpad, said user's fingers and/or hand being positioned in an arbitrary manner with respect to said touchpad when contacting said touchpad, said data not being associated with an image of the user's fingers from said image sensor, said at least one image sensor comprising at least one video camera;

said touchpad being located in a location of said handheld computerized device that is different from the location of said at least one display screen;

analyzing said data from said touchpad on the location and movement of said user's fingers and/or hand according to a model of a human hand, assigning said data on the location and movement of said user's fingers and/or hand to specific fingers on said model of said human hand, thereby making predictions as to the location of the user's hand and fingers;

wherein the model of a human hand is supplemented or refined by obtaining at least one full or partial image of the user hand or hands;

using said model of said human hand, and said predictions of the location of the user's hand and fingers, to compute a graphical representation of at least said user's fingers;

further using images of portions of the user's hand or hands that do not contain images pertaining to the position of the user's fingers to further supplement or refine said model of said human hand;

displaying said graphical representation of at least said user's fingers on said at least one graphics display screen of said handheld computerized device;

wherein distances between said graphical representation of at least said user's fingers on said at least one graphics display screen, and said at least one data entry location, give information to said user to facilitate said user to position said user's fingers and/or hand on said at least one touchpad to enter user data into said at least one data entry location.

14. The method of claim 13, further analyzing said at least one full or partial image of the user's hand or hands to compute one or more user parameters of said model of said human hand;

and using said one or more user parameters of said model of said human hand to replace one or more default parameters of said model of said human hand;

wherein said one or more user parameters comprise the length of at least one or more distal phalanges or intermediate phalanges or proximate phalanges or metacarpals of said user's hand or hands.

15. The method of claim 13, wherein the position of at least the distal phalanges or fingertips of said user's fingers are not photographed by said at least one video camera when said user is touching said touchpad;

wherein said model of a human hand is further supplemented or refined by real-time video images of at least non-finger regions of said human hand obtained from said at least one camera.

16. The method of claim 13, in which said software comprises calibration software to enable the model of said human hand to be calibrated to the touchpad data to more accurately match biomechanical and anatomical characteristics of said user's fingers and/or hand; and wherein said biomedical and anatomical characteristics comprise at least the length of the user's fingers, thereby allowing said model of said human hand to determine the length of said user's fingers for a plurality of different hand configurations.

17. The method of claim 13, used to assist user data entry into said handheld computerized device, further comprising:

displaying at least one data entry location on said at least one graphics display screen of said handheld computerized device;

wherein said at least one data entry location is a graphical display of a keyboard or keypad comprised of a plurality of data entry locations, or wherein said at least one data entry location is a hyperlink.

18. The method of claim 17, in which said at least one data entry location is highlighted on said at least one graphics display screen whenever said computerized device determines that at least one finger on said user's hand has left the touchpad and the position and motion history of said at least one finger is consistent with a capability said at least one finger on said user's hand to strike a position on said touchpad that is consistent with the location of said at least one data entry location on said at least one graphics display screen;

wherein said highlighting commences before said at least one finger has struck the next position on said keypad.

19. The method of claim 17, in which said at least one data entry location comprises alphanumeric letter data entry locations, and wherein said software comprises predictive typing software configured to deduce the most probable letter or letters that the user is likely to type next, and the most probable finger or fingers that the user will use to type this most probable letter, and said computerized device utilizes keystroke predictions made by said predictive typing software, along with said data on the location and movement of said user's fingers and/or hand using said touchpad, to compute the graphical representation of at least said user's fingers.

20. The method of claim 17 wherein either the graphical representation of at least said user's fingers on said at least one graphics display screen is semi-transparent so as to enable the graphical display and said user's fingers to be simultaneously observed; or wherein said at least one data entry location is a graphical display of a semi-transparent keyboard or semi-transparent keypad, thus allowing details of a current application running on said graphics display to be visualized along with said semi-transparent keyboard or semi-transparent keypad.

* * * * *